(12) United States Patent
Goodchild

(10) Patent No.: US 12,160,122 B2
(45) Date of Patent: Dec. 3, 2024

(54) DIGITAL PING CLAMP RAMP

(71) Applicant: AIRA, INC., Chandler, AZ (US)

(72) Inventor: Eric Heindel Goodchild, Phoenix, AZ (US)

(73) Assignee: AIRA, INC., Chandler, AZ (US)

( * ) Notice: Subject to any disclaimer, the term of this patent is extended or adjusted under 35 U.S.C. 154(b) by 544 days.

(21) Appl. No.: 17/489,577

(22) Filed: Sep. 29, 2021

(65) Prior Publication Data

US 2022/0109334 A1    Apr. 7, 2022

Related U.S. Application Data

(60) Provisional application No. 63/086,588, filed on Oct. 1, 2020.

(51) Int. Cl.

| | |
|---|---|
| *H02J 7/00* | (2006.01) |
| *H02J 50/12* | (2016.01) |
| *H02J 50/40* | (2016.01) |
| *H02J 50/80* | (2016.01) |
| *H02J 50/90* | (2016.01) |
| *H04B 5/79* | (2024.01) |
| *H04L 27/04* | (2006.01) |

(52) U.S. Cl.
CPC ............ *H02J 50/80* (2016.02); *H02J 50/12* (2016.02); *H02J 50/402* (2020.01); *H02J 50/90* (2016.02); *H04B 5/79* (2024.01); *H04L 27/04* (2013.01)

(58) Field of Classification Search
USPC ......................................................... 320/108
See application file for complete search history.

(56) References Cited

U.S. PATENT DOCUMENTS

| | | | |
|---|---|---|---|
| 10,505,401 B2 | 12/2019 | Yang et al. | |
| 10,511,197 B2 | 12/2019 | Guillermo et al. | |
| 10,581,491 B2 | 3/2020 | Won et al. | |
| 2009/0108805 A1* | 4/2009 | Liu ........................ | H02J 50/402 320/108 |
| 2015/0042174 A1* | 2/2015 | Friedmann .............. | H02J 50/20 307/104 |
| 2016/0336807 A1* | 11/2016 | Mach ...................... | H02J 50/80 |
| 2018/0138749 A1* | 5/2018 | Lee ......................... | H02J 50/12 |
| 2019/0267828 A1 | 8/2019 | Goodchild et al. | |
| 2020/0244108 A1* | 7/2020 | Kim ........................ | H04B 5/79 |

OTHER PUBLICATIONS

PCT/US2021/052870. International Search Report and Written Opinion dated Dec. 23, 2021. (8 pages).

* cited by examiner

*Primary Examiner* — Samuel Berhanu

(74) *Attorney, Agent, or Firm* — LOZA & LOZA LLP; Anthony Smyth

(57) ABSTRACT

Systems, methods and apparatus for wireless charging are disclosed. One method performed at a wireless charging device includes initiating transmission of a digital ping at a first power level a transmitting coil of the wireless charging device, increasing power level of the digital ping one or more times until current flowing to the transmitting coil has an amplitude that supports Amplitude Shift Key modulation of the digital ping, and determining a charging configuration for transferring power to a chargeable device when a response to the digital ping is received from the chargeable device.

19 Claims, 15 Drawing Sheets

DIGITAL PING CLAMP RAMP

PRIORITY CLAIM

This application claims priority to and the benefit of provisional patent application No. 63/086,588 filed in the United States Patent Office on Oct. 1, 2020, the entire content of this application being incorporated herein by reference as if fully set forth below in their entirety and for all applicable purposes.

TECHNICAL FIELD

The present invention relates generally to wireless charging of batteries, including batteries in mobile computing devices and more particularly to techniques for detecting and communicating with devices to be charged.

BACKGROUND

Wireless charging systems have been deployed to enable certain types of devices to charge internal batteries without the use of a physical charging connection. Devices that can take advantage of wireless charging include mobile processing and/or communication devices. Standards, such as the Qi standard defined by the Wireless Power Consortium enable devices manufactured by a first supplier to be wirelessly charged using a charger manufactured by a second supplier. Standards for wireless charging are optimized for relatively simple configurations of devices and tend to provide basic charging capabilities.

Conventional wireless charging systems typically use a "Digital Ping" to determine if a receiving device is present on or proximate to a transmitting coil in a base station for wireless charging. The transmitter coil has an inductance (L) and, a resonant capacitor that has a capacitance (C) is coupled to the transmitting coil to obtain a resonant LC circuit.

Improvements in wireless charging capabilities are required to identify and support continually increasing complexity of mobile devices and changing form factors.

DETAILED DESCRIPTION

Figure 1:
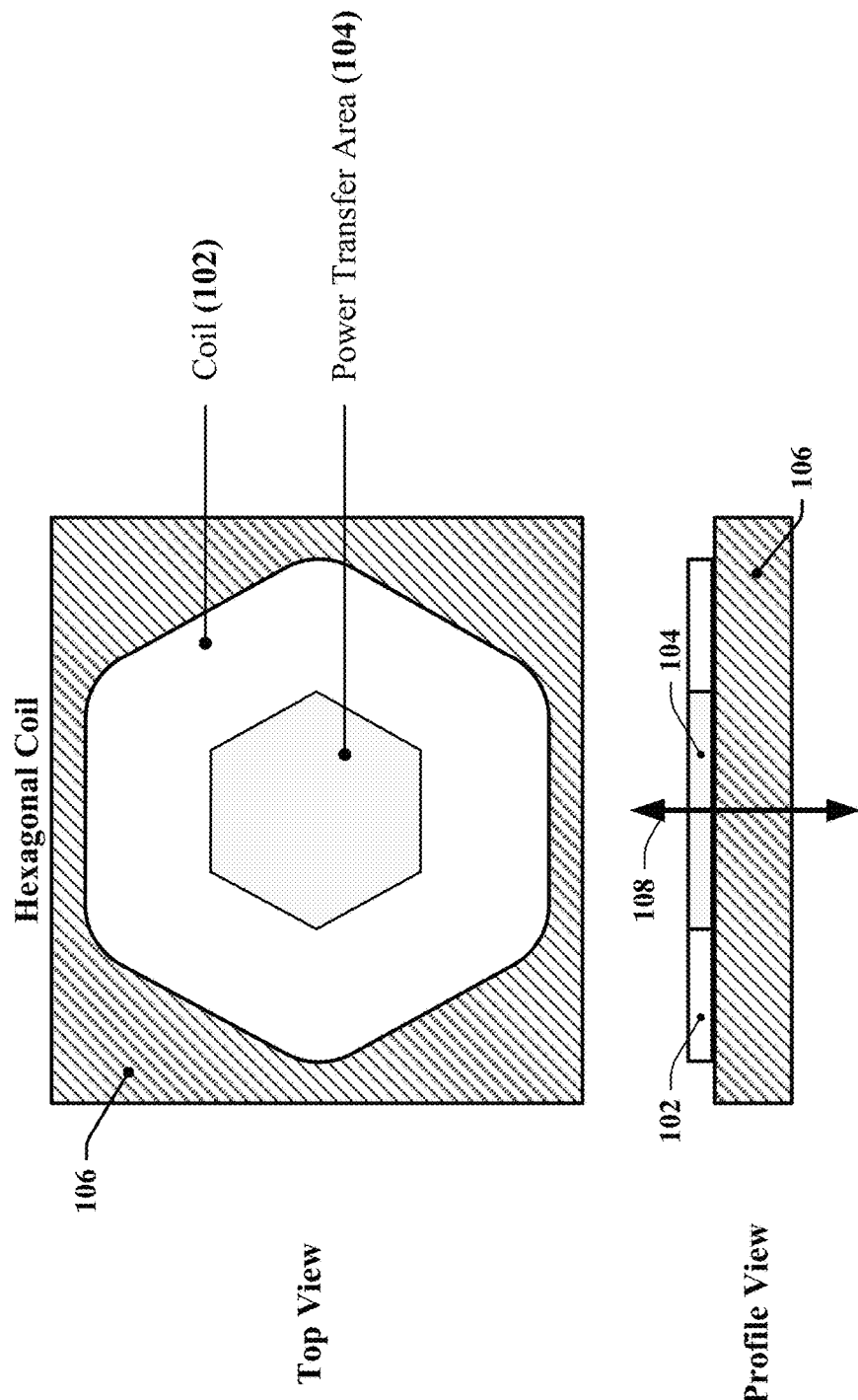
FIG. 1 illustrates an example of a charging cell that may be employed to provide a charging surface in accordance with certain aspects disclosed herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of wireless charging systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a processor-readable storage medium. A processor-readable storage medium, which may also be referred to herein as a computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), Near Field Communications (NFC) token, random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Overview

Certain aspects of the present disclosure relate to systems, apparatus and methods applicable to wireless charging devices and techniques. Charging cells may be configured with one or more inductive coils to provide a charging surface in a charging device where the charging surface enables the charging device to charge one or more chargeable devices wirelessly. The location of a device to be charged may be detected through sensing techniques that associate location of the device to changes in a physical characteristic centered at a known location on the charging surface. Sensing of location may be implemented using capacitive, resistive, inductive, touch, pressure, load, strain, and/or another appropriate type of sensing.

In one aspect of the disclosure, an apparatus has a battery charging power source, one or more charging cells provided on a charging surface of the wireless charging device and a controller. The controller may be configured to initiate transmission of a digital ping at a first power level of a transmitting coil of the wireless charging device, increase power level of the digital ping one or more times until current flowing to the transmitting coil has an amplitude that supports ASK modulation of the digital ping, and determine a charging configuration for transferring power to a chargeable device when a response to the digital ping is received from the chargeable device.

Charging Cells

According to certain aspects disclosed herein, a charging surface may be provided using charging cells that are deployed adjacent to the charging surface. In one example the charging cells are deployed in accordance with a honeycomb packaging configuration. A charging cell may be implemented using one or more coils that can each induce a magnetic field along an axis that is substantially orthogonal to the charging surface adjacent to the coil. In this description, a charging cell may refer to an element having one or more coils where each coil is configured to produce an electromagnetic field that is additive with respect to the fields produced by other coils in the charging cell, and directed along or proximate to a common axis.

In some implementations, a charging cell includes coils that are stacked along a common axis and/or that overlap such that they contribute to an induced magnetic field substantially orthogonal to the charging surface. In some implementations, a charging cell includes coils that are arranged within a defined portion of the charging surface and that contribute to an induced magnetic field within the substantially orthogonal portion of the charging surface associated with the charging cell. In some implementations, charging cells may be configurable by providing an activating current to coils that are included in a dynamically-defined charging cell. For example, a charging device may include multiple stacks of coils deployed across the charging surface, and the charging device may detect the location of a device to be charged and may select some combination of stacks of coils to provide a charging cell adjacent to the device to be charged. In some instances, a charging cell may include, or be characterized as a single coil. However, it should be appreciated that a charging cell may include multiple stacked coils and/or multiple adjacent coils or stacks of coils. The coils may be referred to herein as charging coils, wireless charging coils, transmitter coils, transmitting coils, power transmitting coils, power transmitter coils, or the like.

FIG. 1 illustrates an example of a charging cell 100 that may be deployed and/or configured to provide a charging surface of a charging device. As described herein, the charging surface may include an array of charging cells 100 provided on one or more substrates 106. A circuit comprising one or more integrated circuits (ICs) and/or discrete electronic components may be provided on one or more of the substrates 106. The circuit may include drivers and switches used to control currents provided to coils used to transmit power to a receiving device. The circuit may be configured as a processing circuit that includes one or more processors and/or one or more controllers that can be configured to perform certain functions disclosed herein. In some instances, some or all of the processing circuit may be provided external to the charging device. In some instances, a power supply may be coupled to the charging device.

The charging cell 100 may be provided in close proximity to an outer surface area of the charging device, upon which one or more devices can be placed for charging. The charging device may include multiple instances of the charging cell 100. In one example, the charging cell 100 has a substantially hexagonal shape that encloses one or more coils 102, which may be constructed using conductors, wires or circuit board traces that can receive a current sufficient to produce an electromagnetic field in a power transfer area 104. In various implementations, some coils 102 may have a shape that is substantially polygonal, including the hexagonal charging cell 100 illustrated in FIG. 1. Other implementations provide coils 102 that have other shapes. The shape of the coils 102 may be determined at least in part by the capabilities or limitations of fabrication technology, and/or to optimize layout of the charging cells on a substrate 106 such as a printed circuit board substrate. Each coil 102 may be implemented using wires, printed circuit board traces and/or other connectors in a spiral configuration. Each charging cell 100 may span two or more layers separated by an insulator or substrate 106 such that coils 102 in different layers are centered around a common axis 108.

Figure 2:
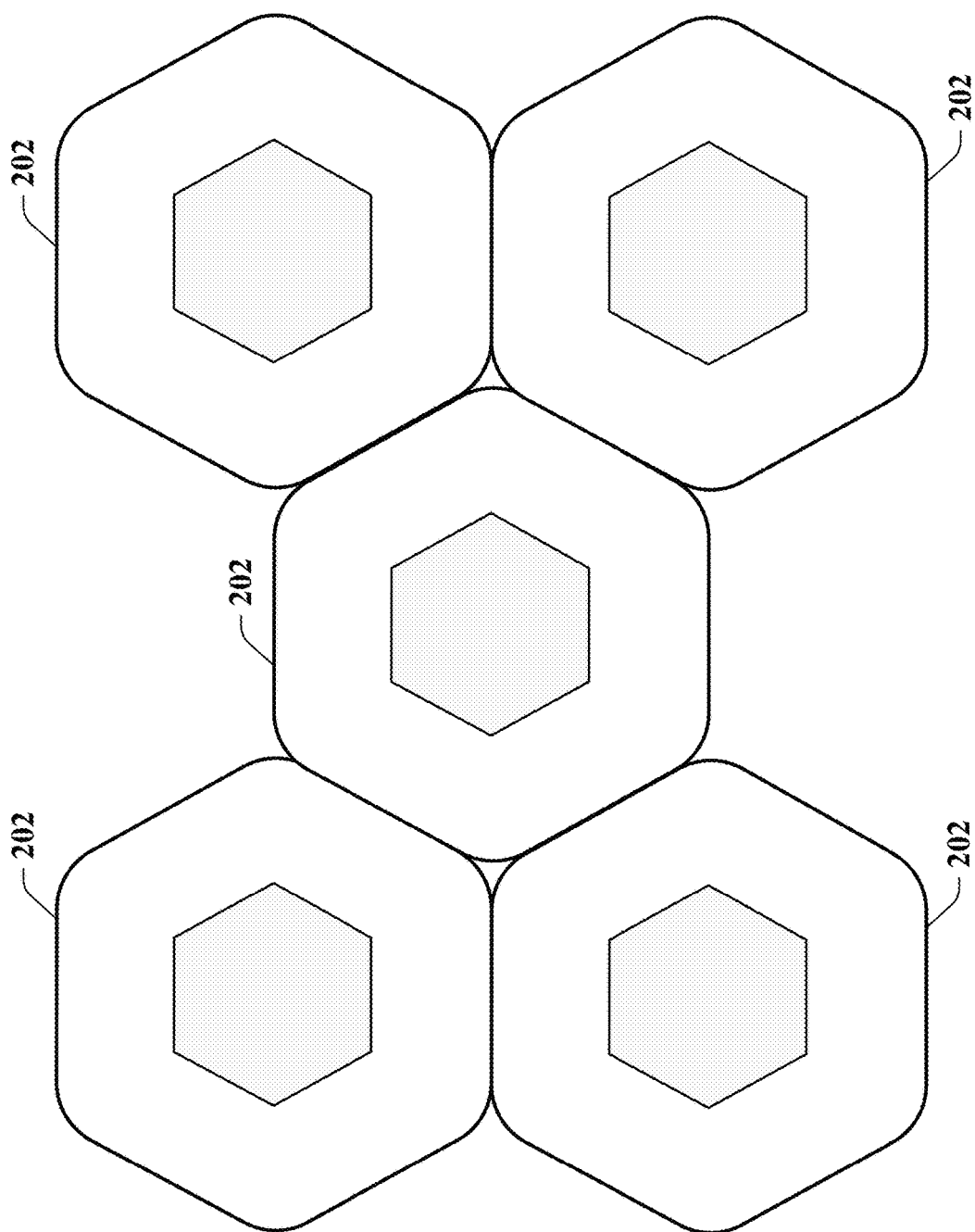
FIG. 2 illustrates an example of an arrangement of charging cells provided on a single layer of a segment of a charging surface that may be adapted in accordance with certain aspects disclosed herein.

FIG. 2 illustrates an example of an arrangement 200 of charging cells 202 provided on a single layer of a segment of a charging surface of a charging device that may be adapted in accordance with certain aspects disclosed herein. The charging cells 202 are arranged according to a honeycomb packaging configuration. In this example, the charging cells 202 are arranged end-to-end without overlap. This arrangement can be provided without through-hole or wire interconnects. Other arrangements are possible, including arrangements in which some portion of the charging cells 202 overlap. For example, wires of two or more coils may be interleaved to some extent.

Figure 3:
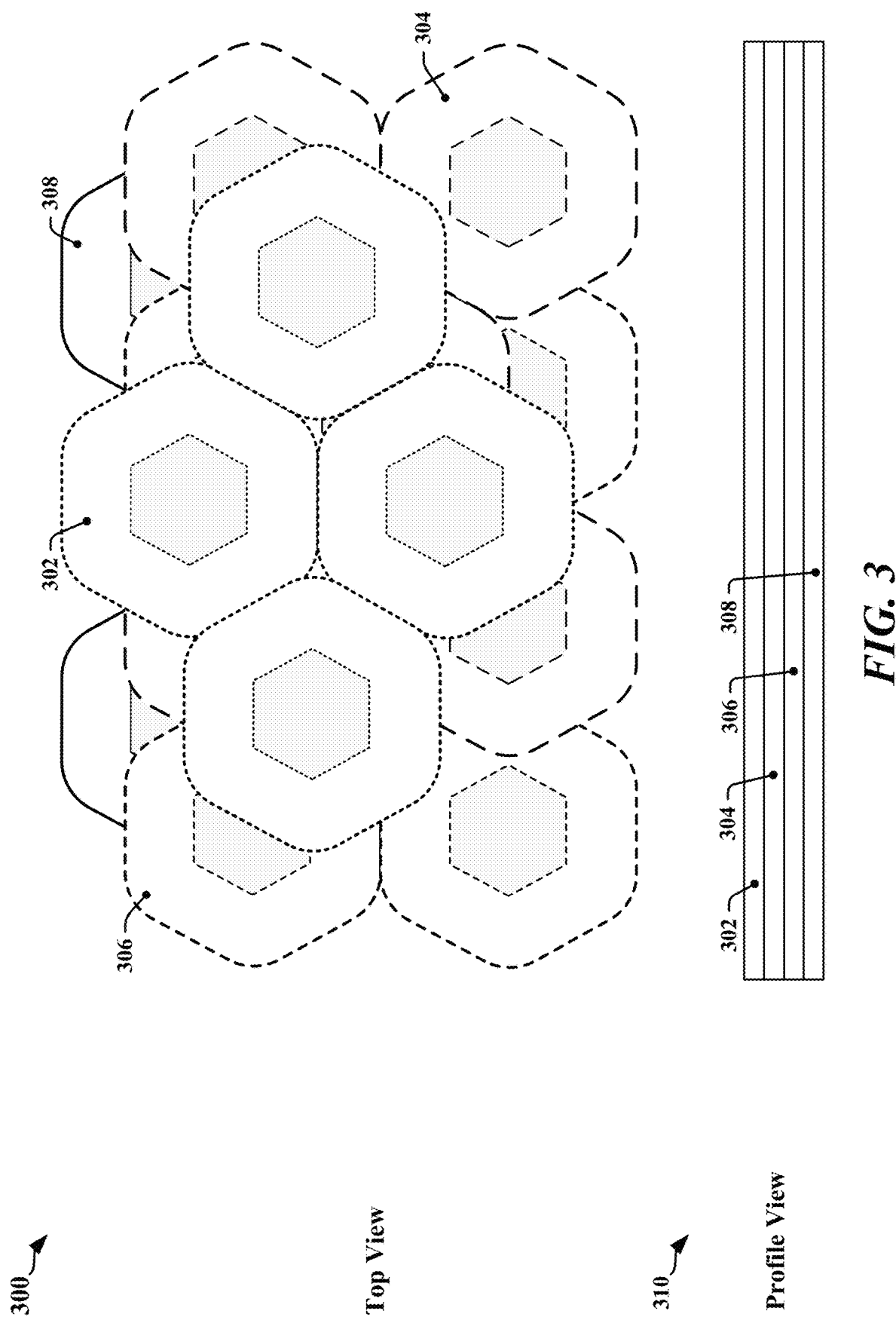
FIG. 3 illustrates an example of an arrangement of charging cells when multiple layers are overlaid within a segment of a charging surface that may be adapted in accordance with certain aspects disclosed herein.

FIG. 3 illustrates an example of an arrangement of charging cells from two perspectives 300, 310 (e.g., top and profile views) when multiple layers are overlaid within a segment of a charging surface that may be adapted in accordance with certain aspects disclosed herein. Layers of charging cells 302, 304, 306, 308 are provided within a segment of a charging surface. The charging cells within each layer of charging cells 302, 304, 306, 308 are arranged according to a honeycomb packaging configuration. In one example, the layers of charging cells 302, 304, 306, 308 may be formed on a printed circuit board that has four or more layers. The arrangement of charging cells 100 can be selected to provide complete coverage of a designated charging area that is adjacent to the illustrated segment. The charging cells may be 302, 304, 306, 308 illustrated in FIG. 3 correspond to power transfer areas provided by transmitting coils that are polygonal in shape. In other implementations, the charging coils may comprise spirally-wound planar coils constructed from wires, each being wound to provide a substantially circular power transfer area. In the latter examples, multiple spirally-wound planar coils may be deployed in stacked planes below the charging surface of a wireless charging device.

Figure 4:
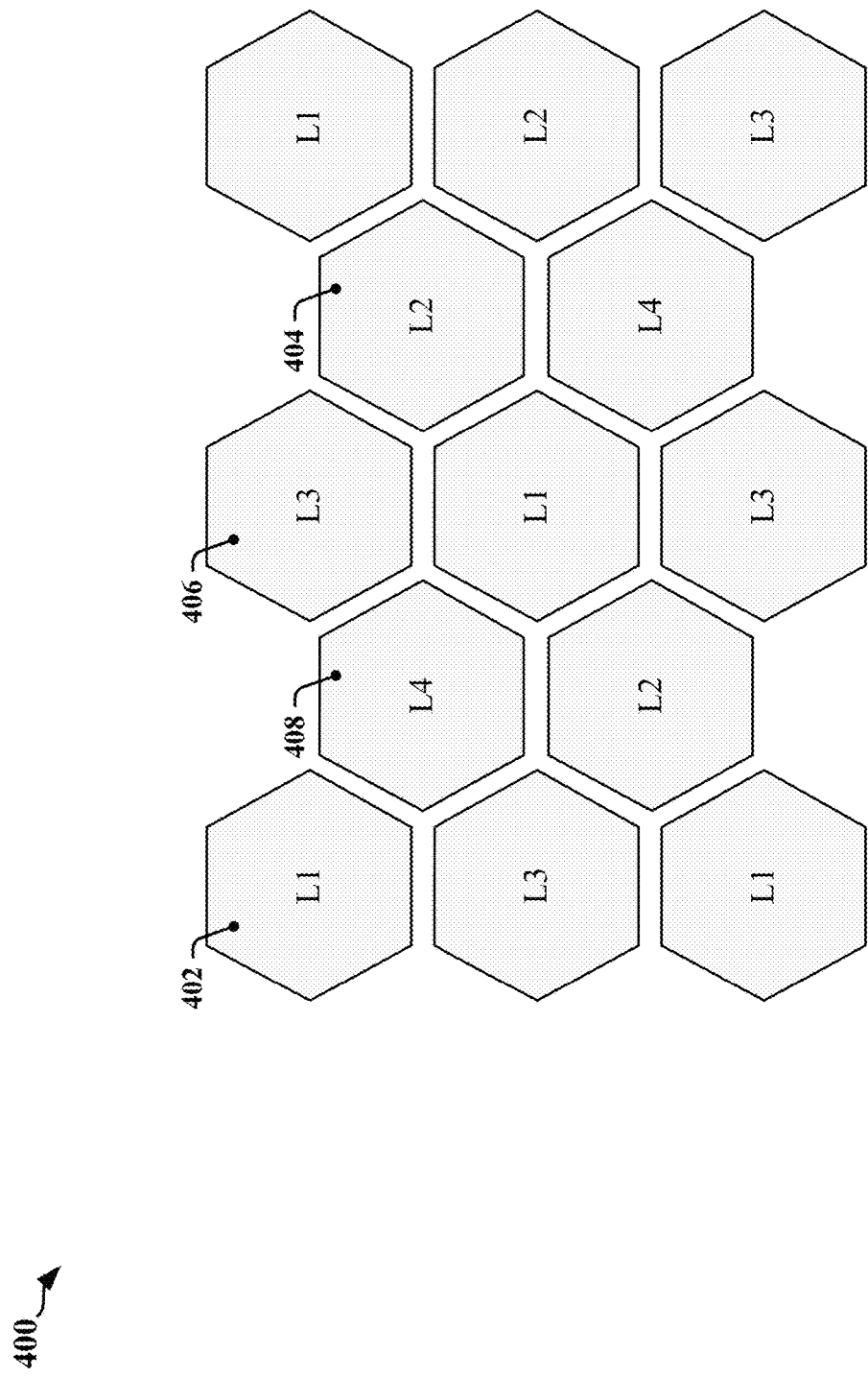
FIG. 4 illustrates the arrangement of power transfer areas provided by a charging surface that employs multiple layers of charging cells configured in accordance with certain aspects disclosed herein.

FIG. 4 illustrates the arrangement of power transfer areas provided in a charging surface 400 that employs multiple layers of charging cells configured in accordance with certain aspects disclosed herein. The illustrated charging surface is constructed from four layers of charging cells 402, 404, 406, 408, which may correspond to the layers of charging cells 302, 304, 306, 308 in FIG. 3. In FIG. 4, each power transfer area provided by a charging cell in the first layer of charging cells 402 is marked "L1", each power transfer area provided by a charging cell in the second layer of charging cells 404 is marked "L2", each power transfer area provided by a charging cell in the third layer of charging cells 406 is marked "L3", and each power transfer area provided by a charging cell in the fourth layer of charging cells 408 is marked "L4".

Figure 5:
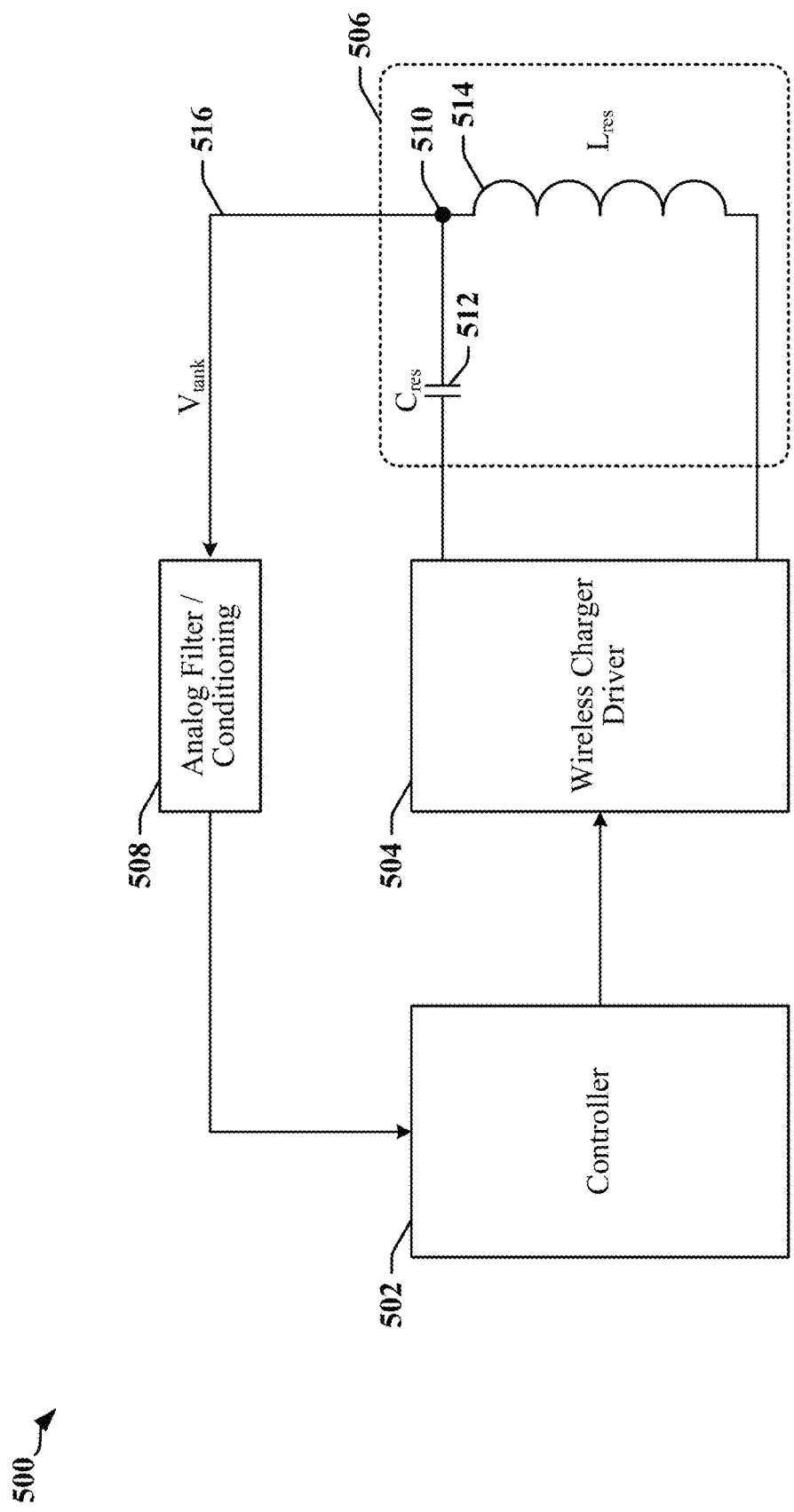
FIG. 5 illustrates a wireless transmitter that may be provided in a charger base station in accordance with certain aspects disclosed herein.

FIG. 5 illustrates a wireless transmitter 500 that may be provided in a charger base station. A controller 502 may receive a feedback signal filtered or otherwise processed by a conditioning circuit 508. The controller may control the operation of a driver circuit 504 that provides an alternating current to a resonant circuit 506 that includes a capacitor 512 and inductor 514. The voltage 516 measured at an LC node 510 of the resonant circuit 506. The resonant circuit 506 may also be referred to herein as a tank circuit, LC tank circuit, or LC tank, and the voltage 516 measured at an LC node 510 of the resonant circuit 506 may be referred to as the tank voltage.

One of the most commonly employed protocols used for wirelessly interconnecting a power transmitter to a power receiver is the Qi protocol. The Qi protocol can enable the power receiver to control the power transmitter wirelessly. The exchange of messages from power receiver to power transmitter is typically effected by way of an Amplitude Shift Keying (ASK) protocol. In some examples, a digital signal processor (DSP) mis employed to decode the ASK signal from the voltage or current in the tank circuit of the inductive power transfer device. Interrupts may be used to measure timing between level changes on the ASK signal. In one example, an external demodulation circuit may cooperate with a timer provided by a microcontroller (MCU) to generate interrupts used to calculate time between edges, which can be used to decode the ASK-modulated signal. In another example, a DSP or digital signal controller may be used to demodulate the ASK-modulated signal using digital signal processing methods. In these and other examples, expensive resources are consumed to obtain a minimalist decoding system.

Figure 6:
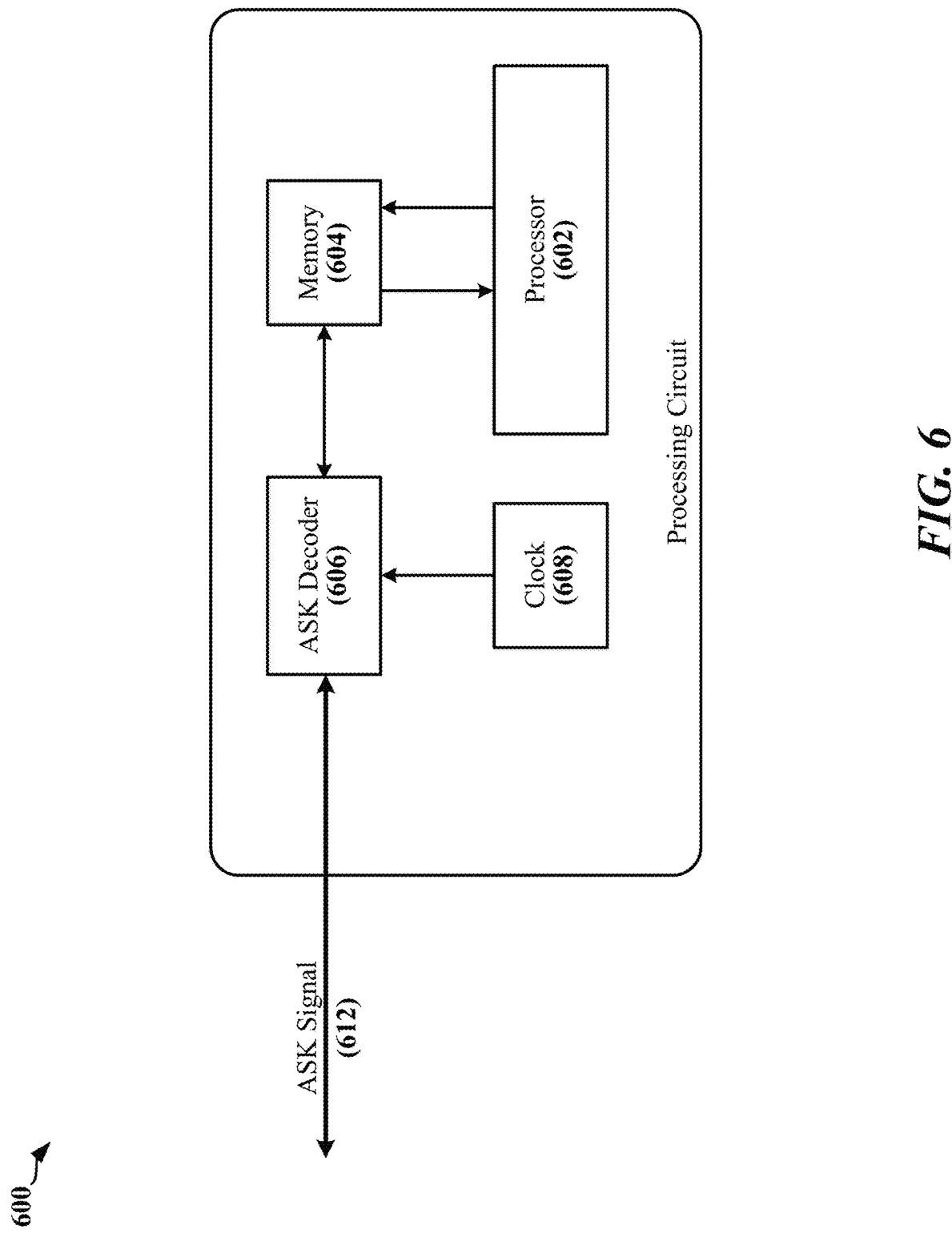
FIG. 6 illustrates a microcontroller that supports ASK demodulation in accordance with certain aspects disclosed herein.

FIG. 6 illustrates an example of a processing circuit 600 that may be configured to receive and decode ASK-modulated signal. The processing circuit 600 includes a processor 602 which may be coupled to a memory device 604 and/or registers that can store messages to be transmitted using an ASK-modulated signal 612 and/or messages decoded from a received ASK-modulated signal 612. The processing circuit 600 includes an ASK decoder 606 that may be implemented using hardware, software or some combination of hardware and software. The ASK decoder 606 may use a clock signal received from a clock generation or recovery circuit to control timing of the transmitted ASK-modulated signal 612 and to control sampling and decoding of a received ASK-modulated signal 612.

Figure 7:
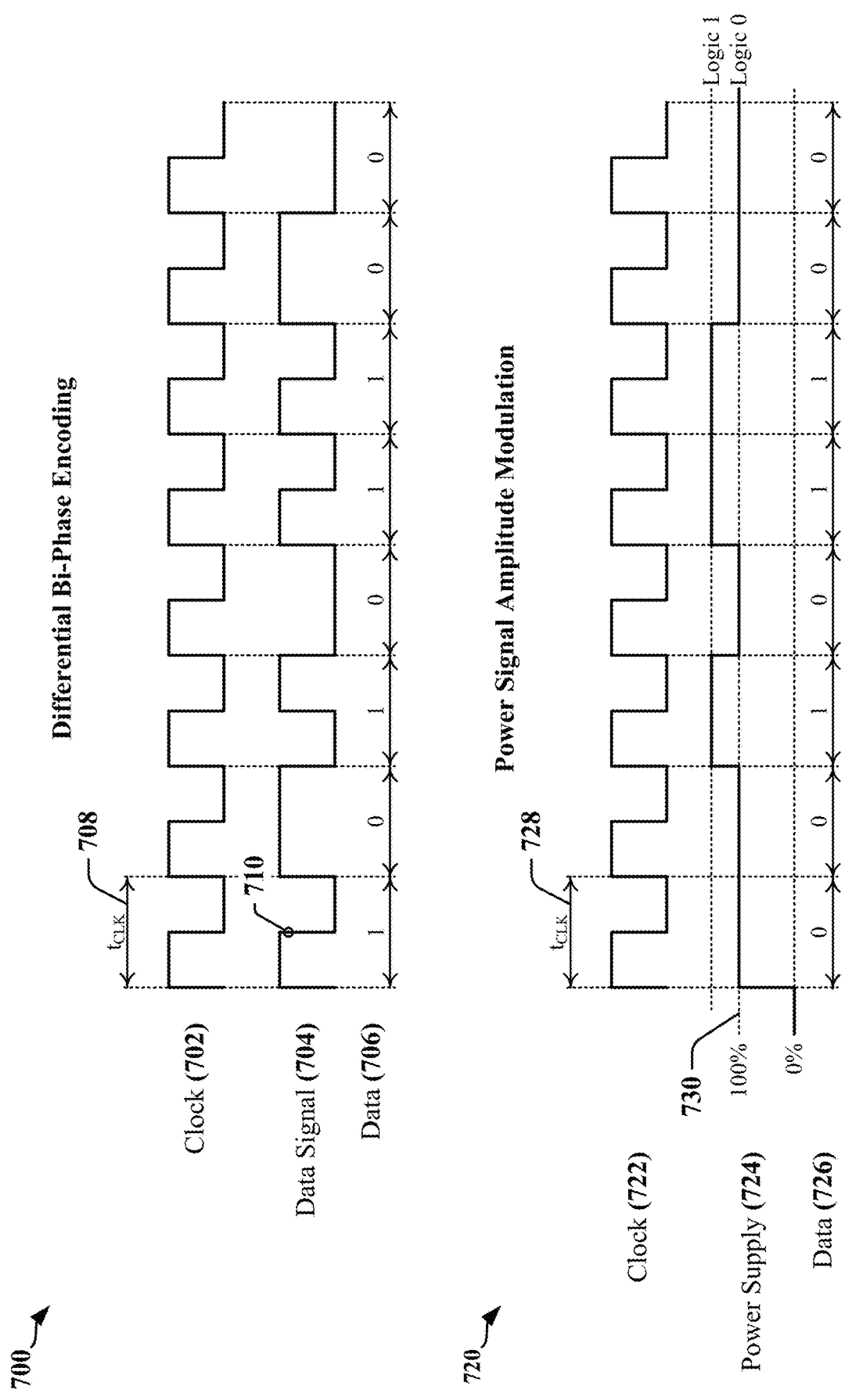
FIG. 7 illustrates examples of encoding schemes that may be adapted to digitally encode messages exchanged between power receivers and power transmitters in accordance with certain aspects disclosed herein.

FIG. 7 illustrates examples of encoding schemes 700, 720 that may be adapted to digitally encode messages exchanged between power receivers and power transmitters. In the first example, a differential bi-phase encoding scheme 700 encodes binary bits in the phase of a data signal 704. In the illustrated example, each bit of a data byte 706 is encoded in a corresponding cycle 708 of an encoder clock signal 702. The value of each bit is encoded in the presence or absence of a transition 710 (phase change) in the data signal 704 during the corresponding cycle 708.

In the second example, a power supply 724 is encoded using a power signal amplitude encoding scheme 720. In the illustrated example, binary bits of a data byte 726 are encoded in level of the power supply 724. Each bit of the data byte 726 is encoded in a corresponding cycle 728 of an encoder clock signal 722. The value of each bit is encoded in the voltage level of the power supply 724 relative to a nominal 100% voltage level 730 of the power supply 724 during the corresponding cycle 708.

Passive Ping

In accordance with certain aspects disclosed herein, location of an object or other chargeable device may be detected based on changes in some property of the electrical conductors that form coils in a charging cell. Measurable differences in properties of the electrical conductors may include changes in capacitance, resistance, inductance and/or temperature when an object is placed in proximity to one or more coils. In some examples, placement of an object on the charging surface can affect the measurable resistance, capacitance, inductance of a coil located near the point of placement. In some implementations, circuits may be provided to measure changes in resistance, capacitance, and/or inductance of one or more coils located near the point of placement. In some implementations, sensors may be provided to enable location sensing through detection of changes in touch, pressure, load and/or strain in the charging surface. Conventional techniques used in current wireless charging applications for detecting devices employ "active ping" or "Digital Ping" methods that operate by driving the transmitting coil and consume substantial power (e.g., 100-200 mW). The field generated by the transmitting coil can be used to detect a receiving device.

Wireless charging devices may be adapted in accordance with certain aspects disclosed herein to support a low-power discovery technique that can replace and/or supplement conventional active ping transmissions. A conventional ping is produced by driving a resonant LC circuit that includes a transmitting coil of a base station. The base station then waits for an ASK-modulated response from the receiving device. A low-power discovery technique may include utilizing a passive ping to provide fast and/or low-power discovery. According to certain aspects, a passive ping may be produced by driving a network that includes the resonant LC circuit with a fast pulse that includes a small amount of energy. The fast pulse excites the resonant LC circuit and causes the network to oscillate at its natural resonant frequency until the injected energy decays and is dissipated. In one example, the fast pulse may have a duration corresponding to a half cycle of the resonant frequency of the network and/or the resonant LC circuit. When the base station is configured for wireless transmission of power within the frequency range 100 kHz to 200 kHz, the fast pulse may have a duration that is less than 2.5 μs. In another example, the fast pulse may have a duration corresponding to multiple cycles of the resonant frequency of the network and/or the resonant LC circuit.

The passive ping may be characterized and/or configured based on the natural frequency at which the network including the resonant LC circuit rings, and the rate of decay of energy in the network. The ringing frequency of the network and/or resonant LC circuit may be defined as:

$$\omega = \frac{1}{\sqrt{LC}} \quad \text{(Eq. 1)}$$

The rate of decay is controlled by the quality factor (Q factor) of the oscillator network, as defined by:

$$Q = \frac{1}{R}\sqrt{\frac{L}{C}} \quad \text{(Eq. 2)}$$

Equations 1 and 2 show that resonant frequency is affected by L and C, while the Q factor is affected by L, C and R. In a base station provided in accordance with certain aspects disclosed herein, the wireless driver has a fixed value of C determined by the selection of the resonant capacitor. The values of L and R are determined by the wireless transmitting coil and by an object or device placed adjacent to the wireless transmitting coil.

The wireless transmitting coil is configured to be magnetically coupled with a receiving coil in a device placed within close proximity of the transmitting coil, and to couple some of its energy into the proximate device to be charged. The L and R values of the transmitter circuit can be affected by the characteristics of the device to be charged, and/or other objects within close proximity of the transmitting coil. As an example, if a piece of ferrous material with a high magnetic permeability placed near the transmitter coils can increase the total inductance (L) of the transmitter coil, resulting in a lower resonant frequency, as shown by Equation 1. Some energy may be lost through heating of materials due to eddy current induction, and these losses may be characterized as an increase the value of R thereby lowering the Q factor, as shown by Equation 2.

A wireless receiver placed in close proximity to the transmitter coil can also affect the Q factor and resonant frequency. The receiver may include a tuned LC network with a high Q which can result in the transmitter coil having a lower Q factor. The resonant frequency of the transmitter coil may be reduced due to the addition of the magnetic material in the receiver, which is now part of the total magnetic system. Table 1 illustrates certain effects attributable to different types of objects placed within close proximity to the transmitter coil.

TABLE 1

| Object | L | R | Q | Frequency |
| --- | --- | --- | --- | --- |
| None present | Base Value | Base value | Base Value (High) | Base Value |
| Ferrous | Small Increase | Large Increase | Large Decrease | Small Decrease |
| Non-ferrous | Small Decrease | Large Increase | Large Decrease | Small Increase |
| Wireless Receiver | Large Increase | Small Decrease | Small Decrease | Large Decrease |

Dynamic Power Management for Digital Ping

A Digital Ping is produced by delivering power to the resonant LC circuit for a duration of time while the transmitter listens for a response from a receiving device. In one example, power is applied for a nominal 90 ms during a Digital Ping. The response may be provided in a signal encoded using ASK modulation. In one example, a typical transmitting base station may ping as frequently as 12.5 times a second (period=1/80 ms) with a power level of 80 mJ per second, such that the Digital Ping discovery procedures consumes 1 W. According to certain aspects disclosed herein, coils in one or more charging cells may be selectively activated to provide an optimal Digital Ping that accommodates chargeable devices with different receiver sensitivities.

Certain aspects of this disclosure relate to detection, selecting a charging configuration, and charging different types of chargeable devices. A charging configuration may define a charging zone on a charging surface, a set of charging cells or one or more transmitting coils to be used for transmitting power wirelessly to a chargeable device. A charging configuration may define frequency, phase or amplitude of currents to be provided to one or more transmitting coils used for charging a chargeable device.

Figure 8:
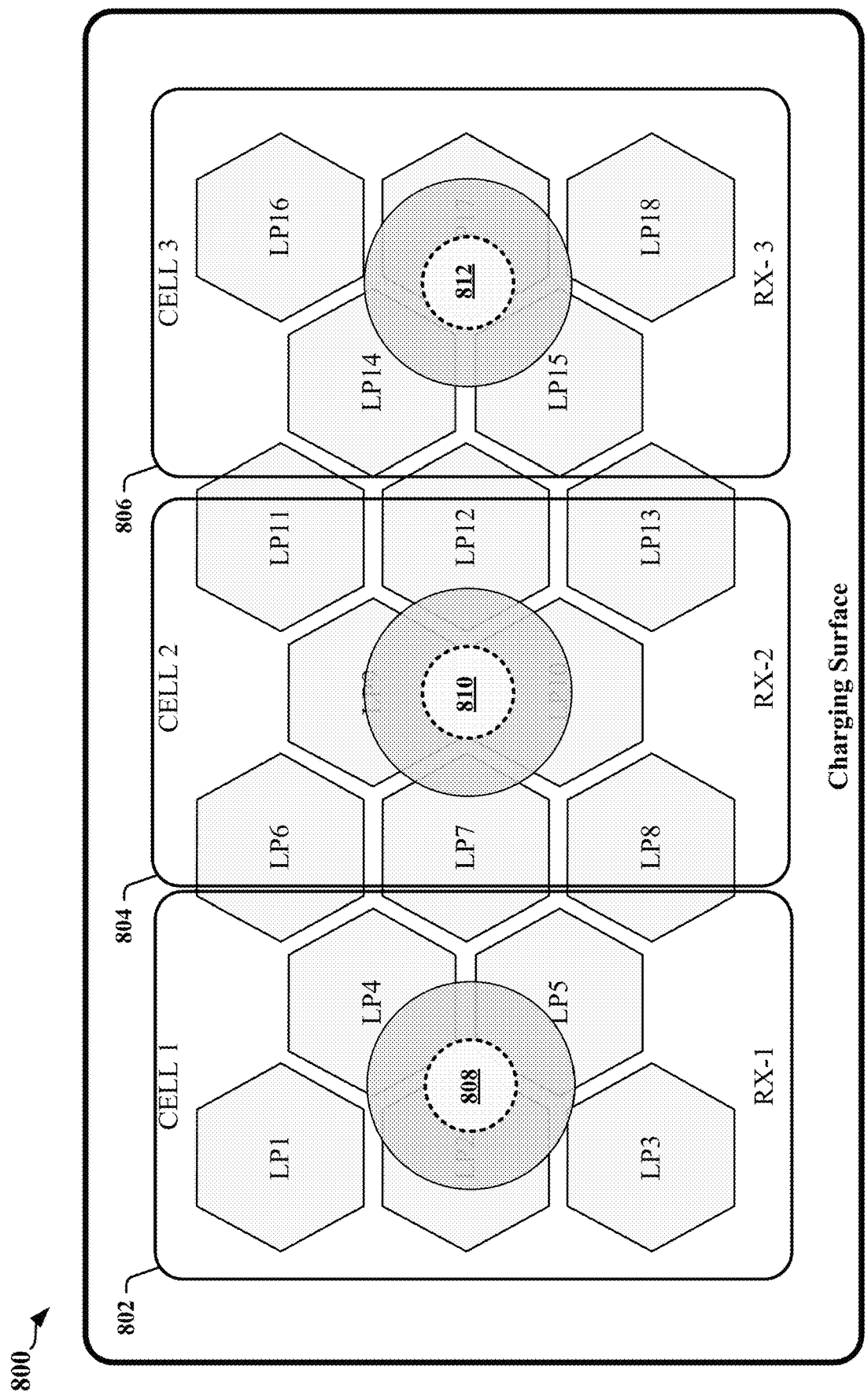
FIG. 8 illustrates an example of a charging surface of a wireless charging device.

FIG. 8 illustrates a charging surface 800 of a wireless charging device upon which three charging cells 802, 804, 806 are defined. In the illustrated example, each of the charging cells 802, 804, 806 may be used to independently transfer power wirelessly to a chargeable device. A controller of the wireless charging device may define a charging configuration for each active charging cell 802, 804, 806. In the illustrated example, receiving coils 808, 810, 812 of the active chargeable devices are located near the center of an associated charging cell 802, 804, 806. In operation, the receiving coils 808, 810, 812 can be electromagnetically coupled with one or more transmitting coils (marked LP-1 through LP-18) in the charging surface 800. In the illustrated example, the wireless charging device may include multiple drivers that may be configurable to provide a charging current to the transmitting coils in a charging cell. The wireless charging device may additionally be capable of concurrent device discovery and/or concurrent control of the receiving coils 808, 810, 812 through the chargeable devices that include the receiving coils 808, 810, 812.

Figure 9:
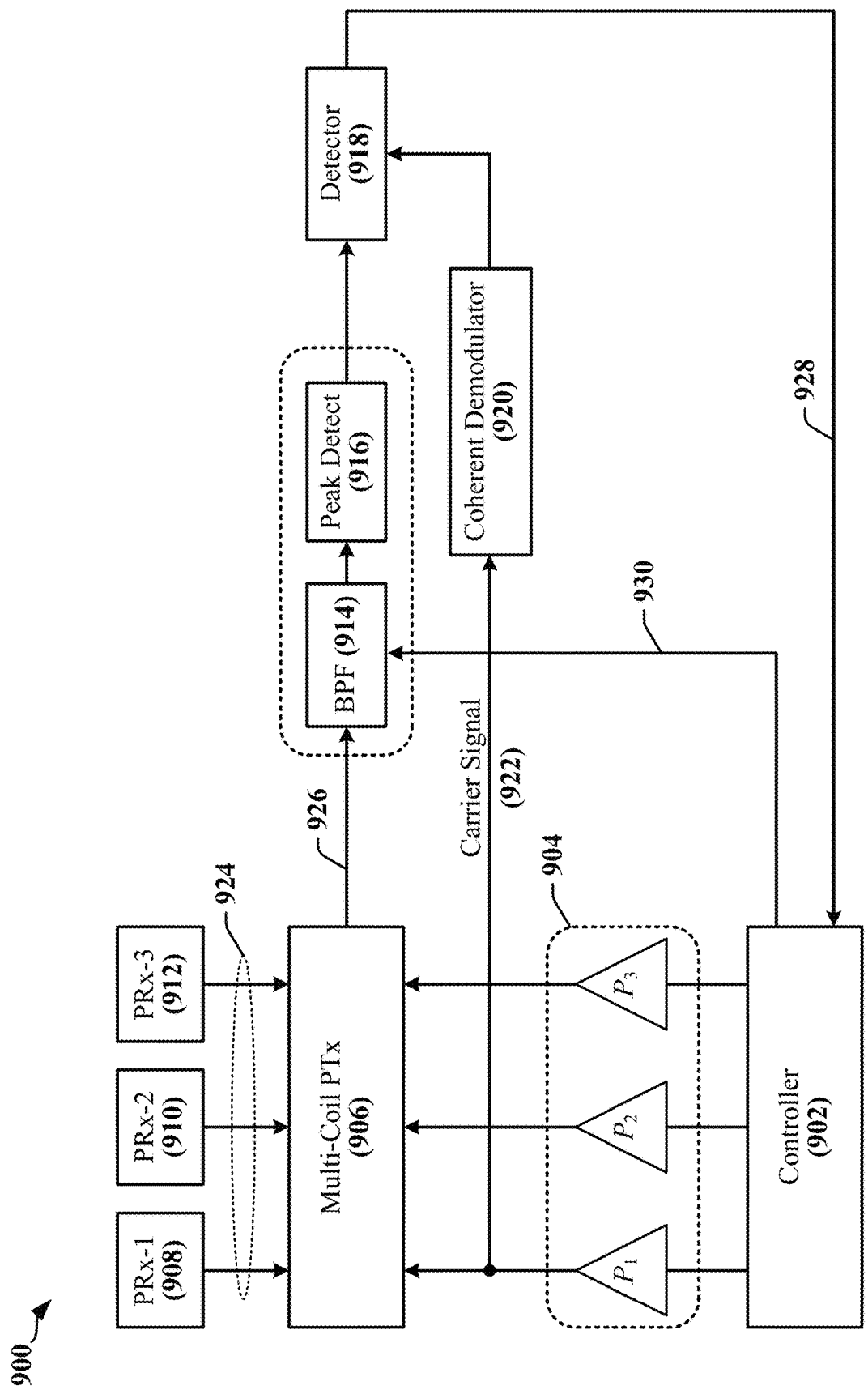
FIG. 9 illustrates an example of a communication interface in a wireless charging device that may be configured to support multi-frequency ASK modulation in accordance with certain aspects disclosed herein.

FIG. 9 illustrates an example of a communication interface 900 in a wireless charging device that supports multi-frequency ASK modulation. Certain wireless charging protocols define a nominal frequency and power level of the charging current to be provided to the power transmitter for power transfer. The operating frequency also serves as the carrier frequency for ASK modulation. The wireless charging device can determine capability and configuration information by decoding ASK-modulated signals 924 received from one or more receiving devices 908, 910, 912. The wireless charging device may define charging configurations for the receiving devices 908, 910, 912 based on the received capability and configuration information. The receiving devices 908, 910, 912 may have different power requirements, and some of the receiving devices 908, 910, 912 may have power receiving circuits that have different sensitivities or that may be rated for different maximum and minimum received power levels.

In the illustrated communication interface 900, a multi-device wireless charger has one or more multi-coil power transmitting circuits 906 that are controlled by a processor, sequencer, state machine or other controller 902. A controller 902 may configure a set of drivers 904 to provide a charging current to each active charging coil in the power transmitting circuits 906. In one example, each active charging coil is coupled to a different receiving device 908, 910, 912. In some instances, a charging current may be provided to multiple coils that are electromagnetically coupled to one or more receiving coils in a single receiving device. The controller 902 may configure the set of drivers 904 to provide charging currents at different power levels.

ASK-modulated signals 926 extracted from the power transmitting circuits 906 may be provided to band-pass filters 914 configured by a band-select signal 930 provided by the controller 902. The band-select signal 930 may configure the band-pass filter 914 to block frequency components that are not associated with the channel provided for ASK encoding. The charging current may be provided at different frequencies to accommodate resonance modifications caused by coupling that is not nominal, for example. In some implementations the band-select signal 930 defines the center frequency and bandwidth of the band-pass filter 914. A filtered version of the ASK-modulated signal 926 is provided to a peak detector 916 that feeds a detector 918, where the detector receives the output of a coherent demodulator 920, which is fed a representation of the carrier signal 922 to enable decoding of information 928 carried in the ASK-modulated signal 926.

The power transmitting circuits 906 may be configured with an operating frequency and power levels for charging based on capability and configuration information received during one or more Digital Pings. The wireless charger may be unaware of the precise location or distance of the receiving devices 908, 910, 912 with respect to a surface of the wireless charger and is typically further unaware of the capability and sensitivity of receiving circuits in the receiving devices 908, 910, 912. Accordingly, the wireless charger transmits the Digital Ping at a nominal power level.

A wireless charging device can determine capability and configuration information using a Digital Ping that includes an exchange of ASK-modulated transmissions. In one example, a Digital Ping involves an exchange between the charger and the device being charged. The charging device transmits a short string of data after detecting presence of a chargeable device. The chargeable device responds with an ASK-modulated transmission that provides information about the state of charge, capabilities and certain parameters that are relevant to the charging process. In one example, the chargeable device responds with information indicating the strength signal of the charging signal received by the chargeable device. The charging device may define a charging configuration based on one or more responses to Digital Pings and may commence charging based on the charging configuration. ASK-modulated data packets may be transmitted by the chargeable device during a charging process that provide information used by the charging device to determine status, adjust power level and terminate the charging process when appropriate.

In many applications, the wireless charger may encounter a large range of device types and sizes that can have very different responses to the same Digital Ping amplitude. A ping amplitude that may be low for one device may be close to the maximum limits of a more sensitive device. In many conventional systems, a tradeoff may be made between failure to detect low sensitivity devices and protection of the circuits in high-sensitivity devices.

According to certain aspects of this disclosure, a Digital Ping may be adapted to enable a charging device to provide the Digital Ping at a power level suited to the type of device to be charged. In one example, the Digital Ping may include or be preceded by a clamp ramp that can be used to determine the apparent sensitivity of the chargeable device and to select a power level for the Digital Ping.

Figure 10:
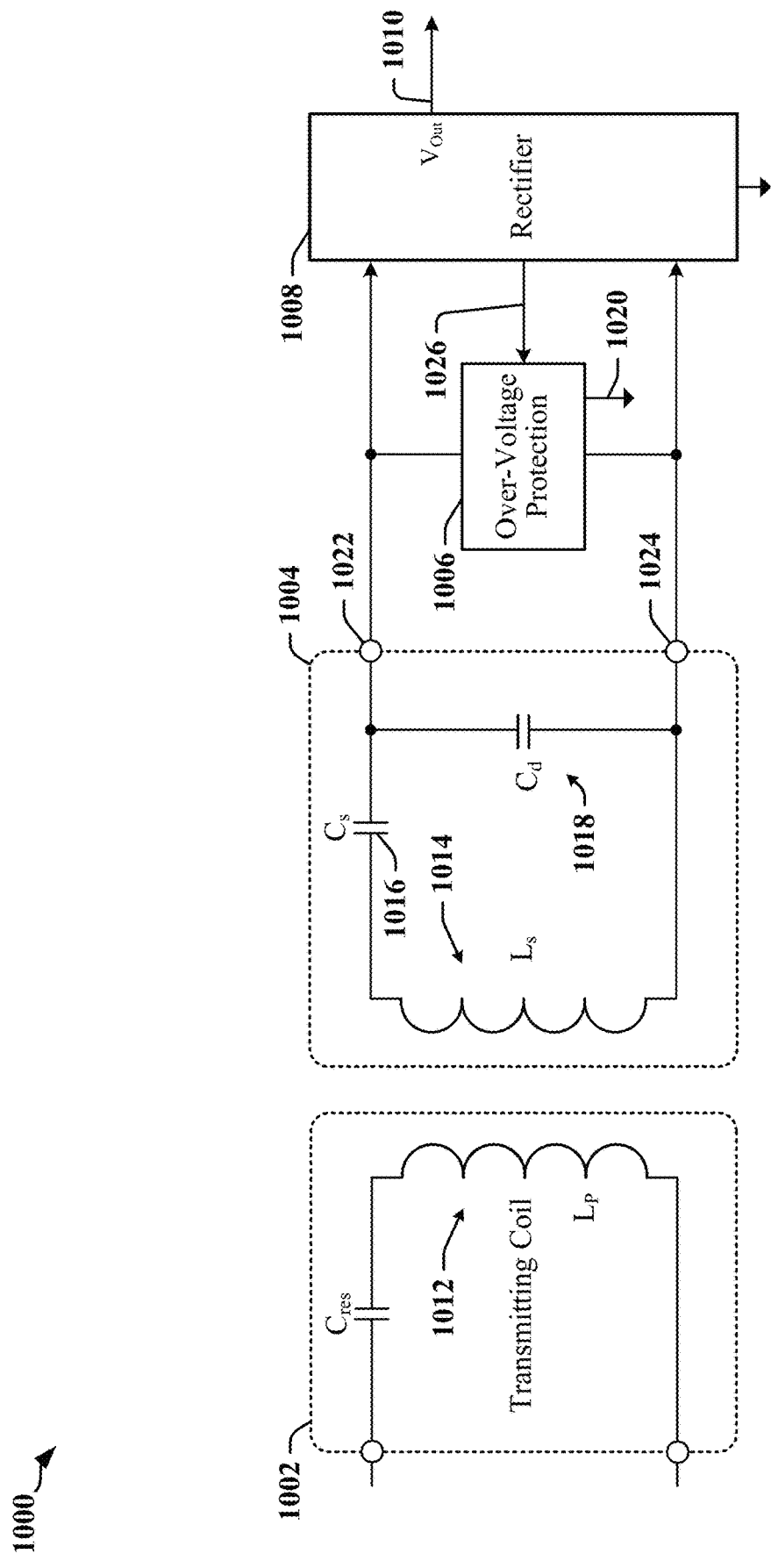
FIG. 10 illustrates a wireless power receiver that may be configured for ASK modulation in accordance with certain aspects disclosed herein.

FIG. 10 illustrates a charging system 1000 in which a receiving circuit 1004 can receive wirelessly transmitted power from a transmitting circuit 1002. The receiving circuit 1004 and the transmitting circuit 1002 may operate in accordance with protocols defined for the Qi standard. The transmitting circuit 1002 may correspond to the resonant circuit 506 illustrated in FIG. 5. The receiving circuit 1004 includes a receiving coil 1014 that operates as the secondary of a transformer, the primary of the transformer being provided by a transmitting coil 1012 in the transmitting circuit 1002. The receiving coil 1004 has an inductance ($L_s$) and is coupled to a series resonant capacitor 1016 that has a capacitance ($C_s$) chosen based on the inductance of the receiving coil 1014, and to tune the receiving circuit 1004 to the frequency of the charging flux provided by the transmitting coil 1012. In one example, the frequency of the charging flux is nominally 100 kHz. The Qi standard specifies that a detection capacitor 1018 be provided in parallel with the receiving coil 1014. The detection capacitor 1018 has a capacitance ($C_d$) chosen based on the inductance of the receiving coil 1014, and to provide a detection resonant circuit that resonates at 1 MHz.

The receiving circuit 1004 is coupled to a rectifier 1008 that is configured to receive current induced in the receiving coil 1014 by the charging flux provided by the transmitting coil 1012 to obtain a direct current (DC) output 1010. A chargeable device is typically equipped with protection circuits that detect conditions that exceed device tolerances or configured limits. For example, a chargeable device may include circuits that can detect or preempt high temperature in one or more circuits and can request or limit received power in order to maintain the circuits within configured or specified temperature ranges.

Chargeable devices that are compatible with protocols defined by the Qi standard have an overvoltage protection circuit 1006 that may include a damper. The damper is a circuit that can limit the peak of oscillations of a signal to a defined voltage. In some instances, a chargeable device may include a circuit that shorts both terminals 1022, 1024 of the receiving circuit 1004 to ground 1020 when received power or voltage exceeds specified or configured limits. The transmitting device can detect the clamper-caused change in coupling between the transmitting coil 1012 and the receiving coil 1014 based on a sudden increase in current and/or tank voltage. The change in coupling may cause the transmitting device to scale back or terminate power transmission.

The damper in an overvoltage protection circuit 1006 can prevent or block an ASK modulated response to the Digital Ping by a receiving device. The receiving device may include clamping circuits that are used to modulate the tank voltage in the transmitting device by changing the coupling between the transmitting coil 1012 and the receiving coil 1014 in accordance with a pulse-width modulated signal, for example. ASK modulating circuits in the receiving device may be rendered ineffective when the damper in the overvoltage protection circuit 1006 overrides the ASK clamping circuits.

A wireless charging device may be used to charge a variety of types of chargeable devices, including sensors watches smartphones, tablet computers, etc. The level of wireless power that a device can receive may depend on the type, location and orientation of the device. Different types of devices can be more sensitive to wireless power transmissions than other devices. A Digital Ping transmitted at an average power level may trigger overvoltage protection in sensitive devices and may be imperceptible to a low sensitivity device. Certain aspects of this disclosure provide power ramping techniques that can prevent high-sensitivity devices from clamping. In one example, a low Digital Ping power may be provided at the beginning of the Digital Ping and increased in steps during the Digital Ping until a specified minimum or desired current is measured in the transmitting circuit. The measured current level can indicate quality of coupling, voltage or received power level in the receiving device.

Figure 11:
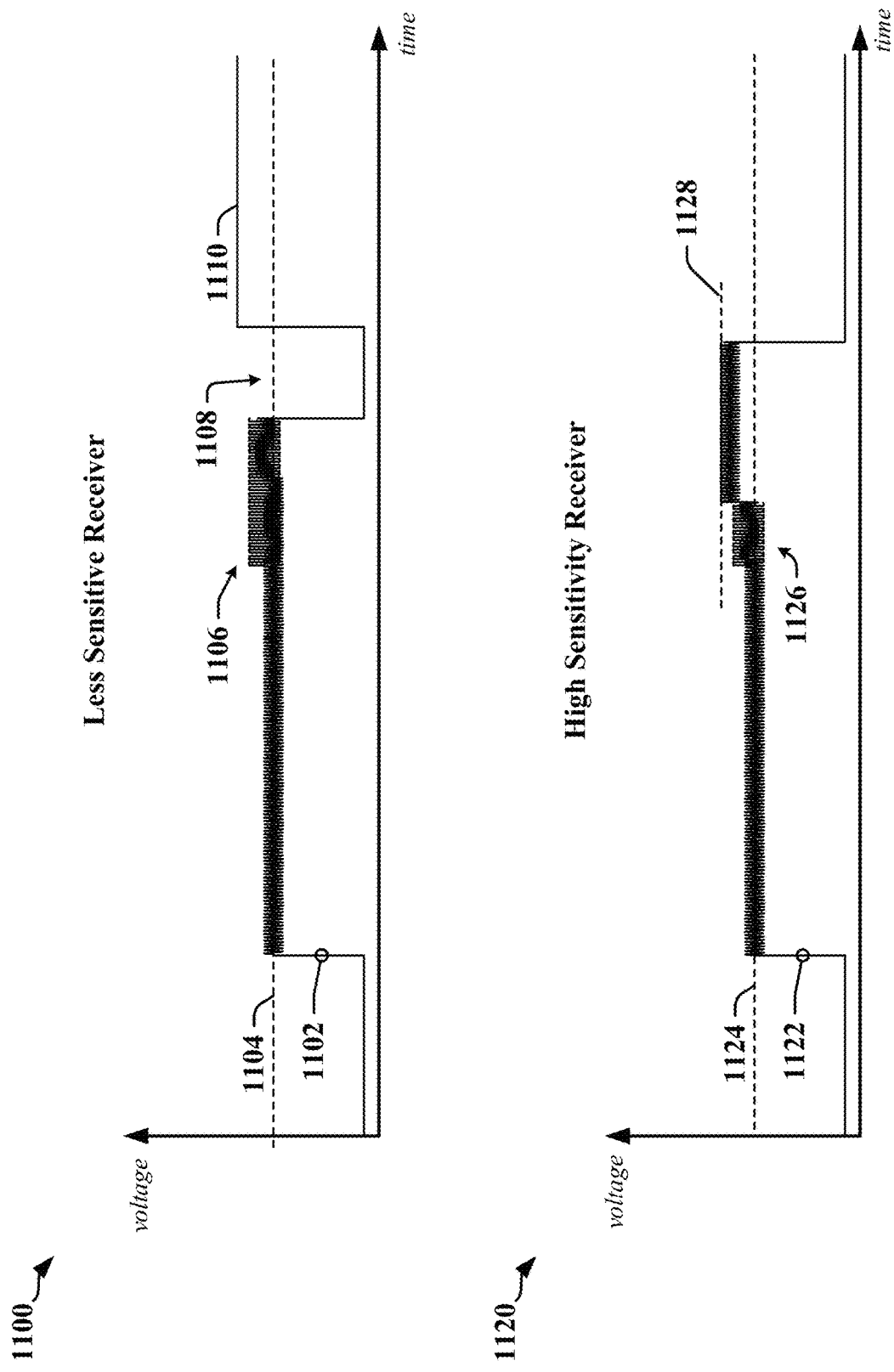
FIG. 11 illustrates responses to Digital Pings in accordance with certain aspects disclosed herein.

FIG. 11 illustrates certain responses 1100, 1120 of a chargeable device to Digital Pings. The responses 1100, 1120 may be indicated by tank voltage in a transmitting device. In a first response 1100, a first receiving device is capable of receiving the Digital Ping at the transmitted power level. The start of the Digital Ping is indicated by a transition (edge 1102) in the measured tank voltage. The peak level or average level 1104 of the tank voltage remains at a consistent voltage level or changes gradually throughout the Digital Ping, including during the transmission 1106 of ASK modulated information by the receiving device to indicate signal strength.

The second response 1120 illustrates an example of a Digital Ping that triggers a damper in a second receiving device. In this example, the second receiving device has greater sensitivity than the first receiving device and the power level of the Digital Ping causes the clamper in an overvoltage protection circuit to be triggered. The start of the Digital Ping is indicated by a transition (edge 1122) in the measured tank voltage. The initial level 1124 of the tank voltage may change in a step-like manner when a damper in the receiving device is triggered by the power level induced in the receiving device. In the illustrated example, transmission 1126 by the receiving device of ASK modulated information indicating signal strength triggers the overvoltage damper in the receiving device. The activation of the overvoltage damper disables or inhibits the ASK modulation circuits in the receiving device. The overvoltage damper shorts the receiving coil in the receiving device causing a step change in coupling characteristics, which may be registered as a step increase in current amplitude or a step increase to a higher voltage level 1128. The charging device recognizes the change in coupling and terminates the Digital Ping.

According to certain aspects of this disclosure, a Digital Ping may be configured with a clamp ramp that enables the transmitting device to limit the power level of the Digital Ping to a level suited to the chargeable device being pinged. The clamp ramp provides a method of preventing sensitive devices from clamping in response to the Digital Ping while providing sufficient power for less devices. The clamp ramp can provide the configuration process with a wider dynamic range capability during Digital Ping.

Figure 12:
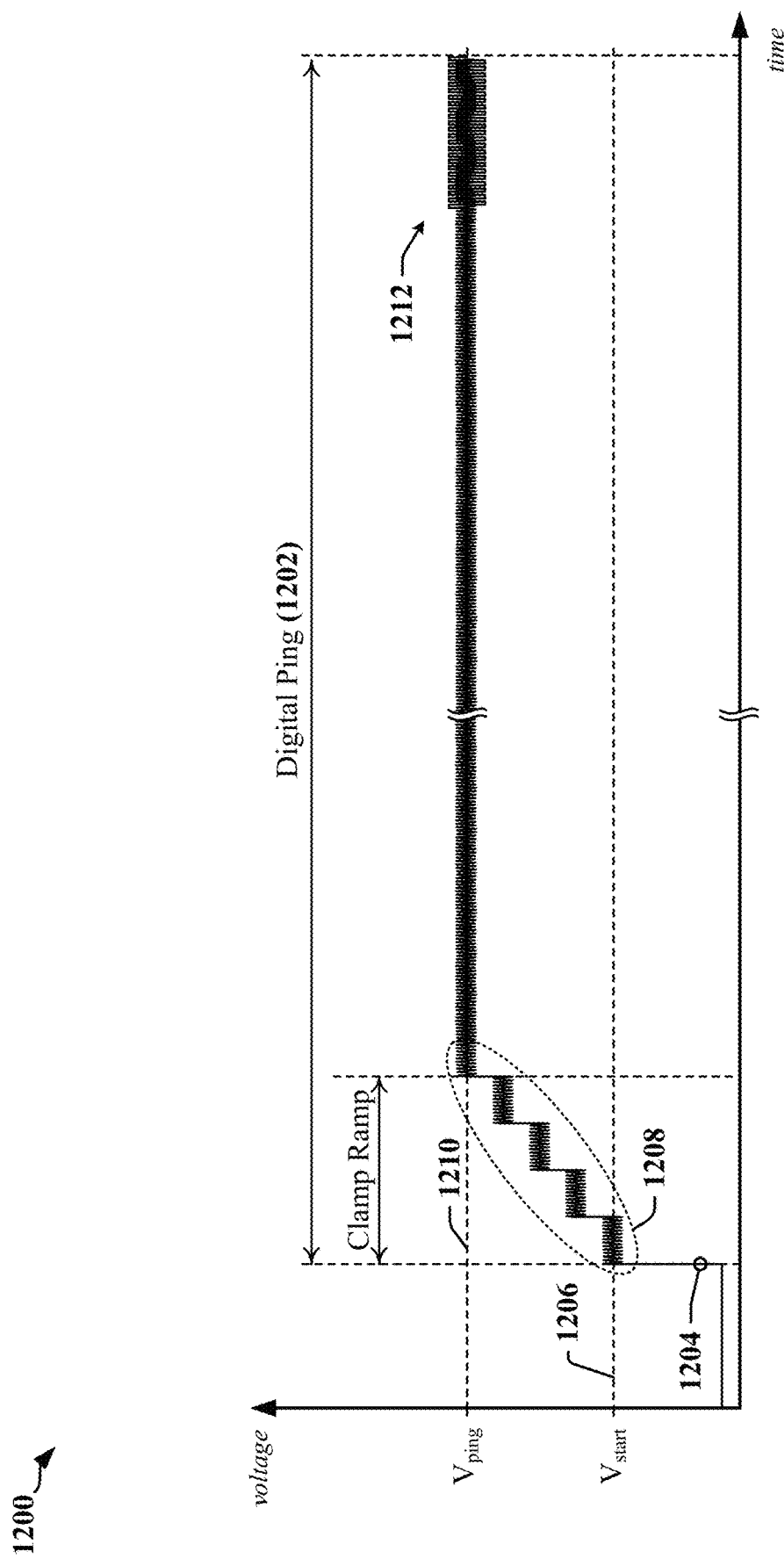
FIG. 12 illustrates a response to a Digital Ping that has been adapted in accordance with certain aspects of the disclosure.

FIG. 12 illustrates a response 1200 to a Digital Ping 1202 adapted in accordance with certain aspects of the disclosure. The response 1200 may be represented by the tank voltage measured in a transmitting circuit of a wireless charging device.

The Digital Ping 1202 may include or be preceded by a clamp ramp 1208 that enables the wireless charging device to select a power level for the Digital Ping 1202. An initial power level, indicated by the start voltage 1206 measured on the tank circuit, is selected to enable the most sensitive receiving device to respond to the Digital Ping 1202 at the initial power level. The wireless charging device may determine whether the current flowing to its transmitting coil has an amplitude that corresponds to a minimum amplitude or a range of amplitudes that indicate a coupling with the receiving device that enables the receiving device to respond to the Digital Ping 1202. The wireless charging device may increase the power level of the Digital Ping 1202 one or more times during the clamp ramp 1208 until the current flowing in the transmitting coil has an amplitude that corresponds to a minimum amplitude or to a range of amplitudes. In one example, the wireless charging device may determine a suitable amplitude of current is flowing in the transmitting coil based on tank voltage level 1210 ($V_{ping}$).

The step size for increasing transmitter power level during the clamp ramp 1208 can be configured to accommodate sensitive receiving devices. For example, the step size may be selected to be less than the difference between minimum and maximum power levels that can be accepted by the most sensitive receiving devices, thereby ensuring that an increase in transmitter power during the clamp ramp 1208 does not trigger a clamper circuit in the receiving device. The duration and number of steps in the clamp ramp 1208 typically produces a clamp ramp 1208 that is less that 5% of the duration of the Digital Ping 1202, and the clamp ramp 1208 can be used without increasing the time needed for device discovery.

Figure 13:
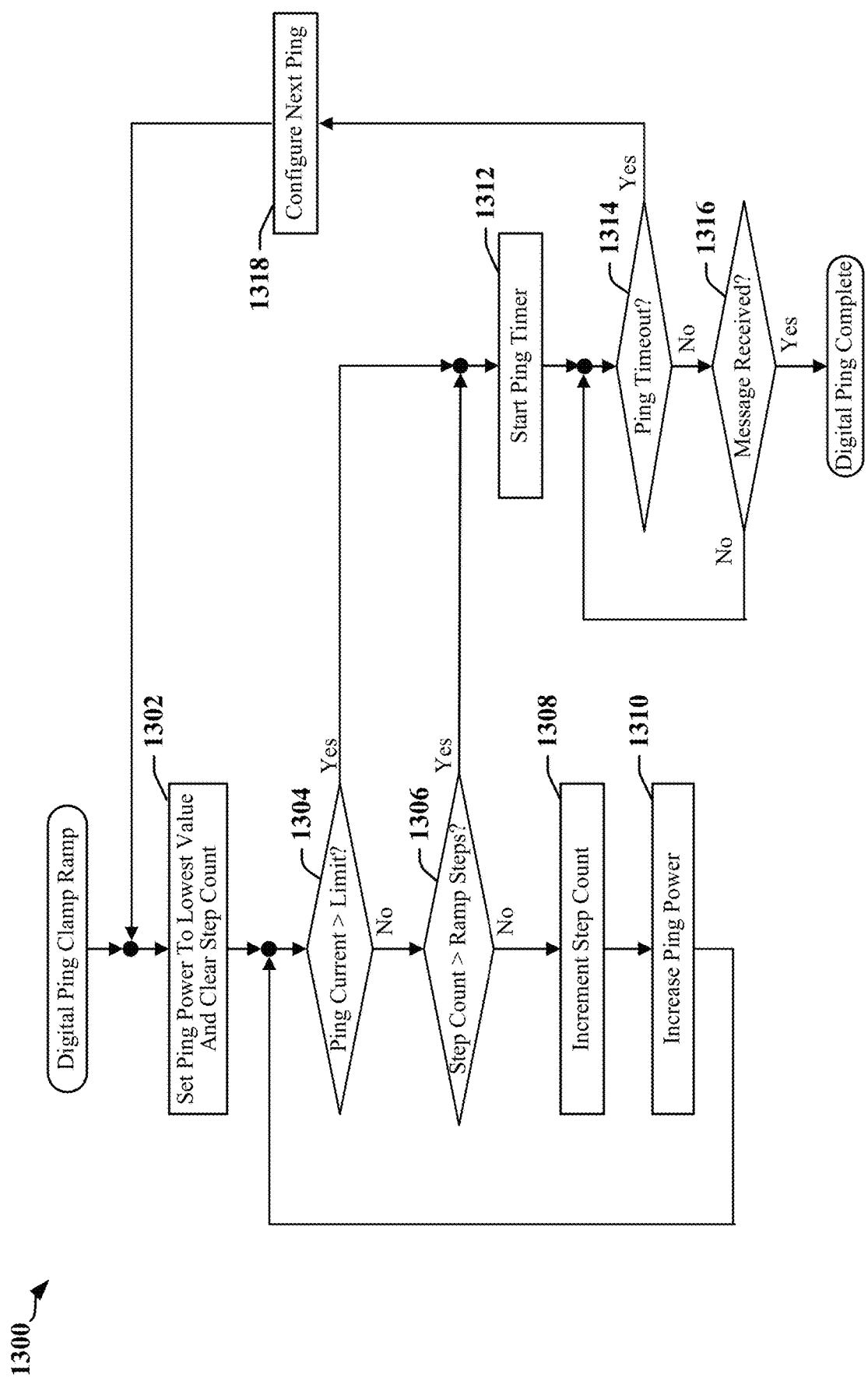
FIG. 13 is first flowchart illustrating an example of a Digital Ping procedure executed in accordance with certain aspects of this disclosure.

FIG. 13 is flowchart 1300 illustrating an example of a method for dynamic power management in a Digital Ping procedure executed in accordance with certain aspects of this disclosure. The method may be performed by a controller in a multi-device wireless charger. At block 1302, the controller may set transmit power to the lowest level for a Digital Ping. The lowest level may be determined based on the power level that can be handled by the most sensitive receiving device expected to be placed on a surface of the charging device. The controller may clear step counter or otherwise initialize the step counter. The step counter may be used to determine when a maximum number of steps configured for a clamp ramp 1208 has been executed. The controller may also initialize a timer that defines a maximum duration for the Digital Ping.

At block 1302, the controller may determine whether the ping current has reached a minimum level or a threshold level that corresponds to a power level that supports Digital Ping ASK encoding. The ping current measured for a selected power setting may be dependent on the quality of coupling between the transmitting coil and the receiving coil. The ping current measured for a selected power setting may be dependent on the sensitivity of the receiving device. When the ping current has reached a minimum level or a threshold level, the method continues at block 1312. When the ping current has not reached a minimum level or a threshold level the method may continue at block 1306 where the controller may determine whether a maximum number of steps for the clamp ramp 1208 has been executed. When the maximum number of steps for the clamp ramp 1208 has been executed, the method may continue at block 1312. When the maximum number of steps for the clamp ramp 1208 has not been executed, the method may continue at block 1308, with the controller incrementing the step count. At block 1310, the controller may then increase the power level for the Digital Ping. The method then returns to block 1304.

At block 1312, the controller may start the Digital Ping timer. At block 1314 the controller may determine whether the Digital Ping timer has expired and may at block 1316 check whether a message has been received from the power receiving device when the timer has not expired. When no message has been received the controller may return to block 1314. When a message has been received the controller may determine that the Digital Ping has been successfully completed. In one example, the controller may use information provided in the message to define a charging configuration for charging the power receiving device. The controller may proceed to block 1318 when it is determined at block 1314 that the Digital Ping timer has expired. At block 1318, the controller may configure a next Digital Ping. In one example, configuring the next Digital Ping includes selecting a transmitting coil to be used for transmitting the next Digital Ping.

Figure 14:
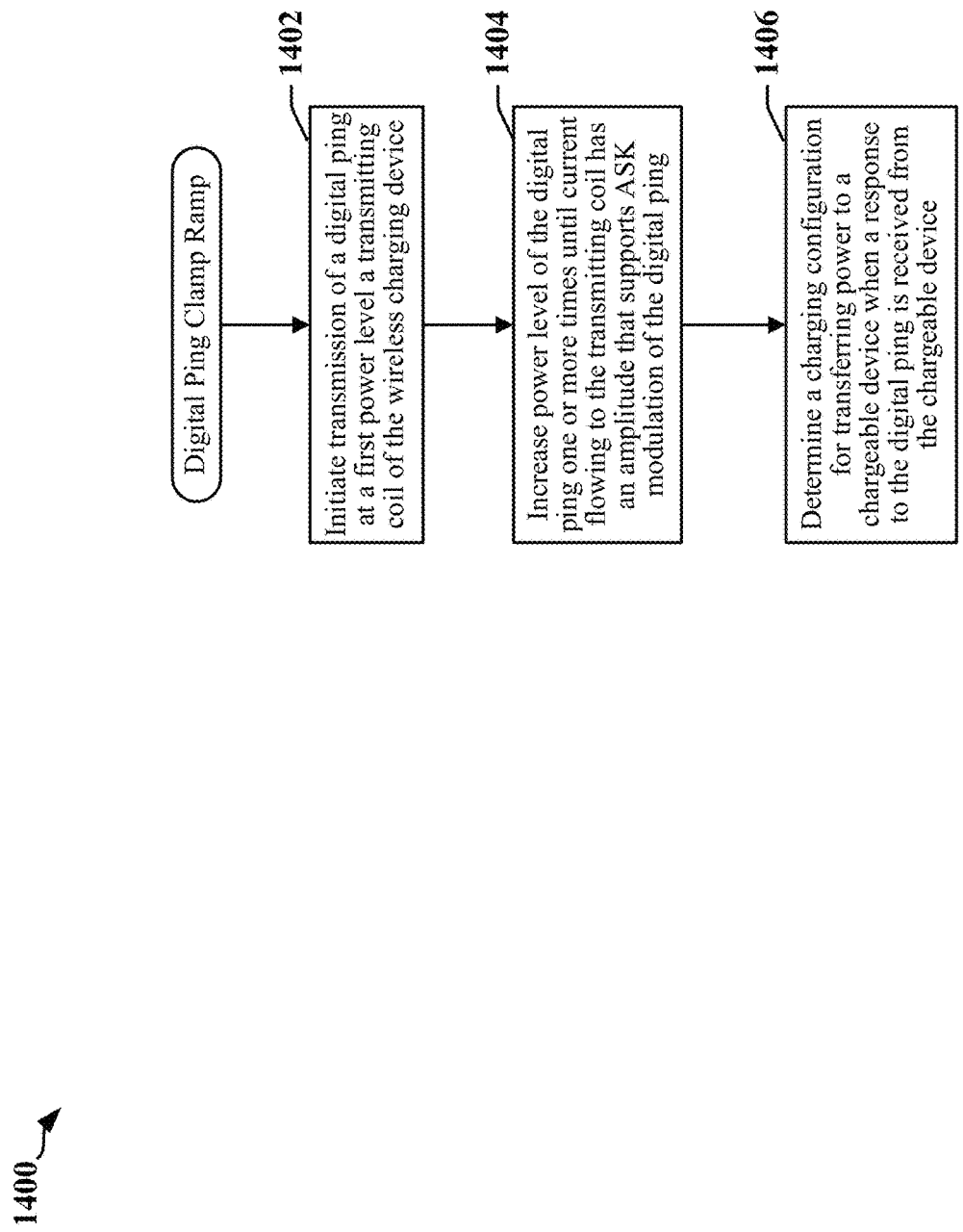
FIG. 14 is second flowchart illustrating an example of a Digital Ping procedure executed in accordance with certain aspects of this disclosure.

FIG. 14 is flowchart 1400 illustrating an example of a method for dynamic power management in a Digital Ping procedure executed in accordance with certain aspects of this disclosure. The method may be performed by a controller in a multi-device wireless charger. At block 1402, the controller may initiate transmission of a digital ping at a first power level a transmitting coil of the wireless charging device. At block 1404, the controller may increase power level of the digital ping one or more times until current flowing to the transmitting coil has an amplitude that supports ASK modulation of the digital ping. At block 1406, the controller may determine a charging configuration for transferring power to a chargeable device when a response to the digital ping is received from the chargeable device.

In one example, the controller may determine the charging configuration based on information identifying a capabilities or configuration of the chargeable device provided in the response. The controller may be further configured to determine the charging configuration from information identifying a requested charging current provided in the response. The controller may calculate the current flowing to the transmitting coil using a voltage level measured at the transmitting coil. The response to the digital ping includes information encoded in the voltage level measured at the transmitting coil is modulated using ASK modulation. The controller may determine that the current flowing to the transmitting coil has an amplitude that supports ASK modulation of the digital ping when the current flowing to the transmitting coil has an amplitude that equals or exceeds a threshold level. The controller may terminate the digital ping after a preconfigured duration of time unless an ASK modulated response is received. The power level of the digital ping may be increased by a preconfigured step value for each of the one or more power level increases. The controller may determine that the chargeable device is present on or near a charging surface of the wireless charging device. Presence of the chargeable device on or near the charging surface may be determined using a passive ping procedure. The controller may transmit the first ping based on determined presence of the chargeable device on or near the charging surface.

Example of a Processing Circuit

Figure 15:
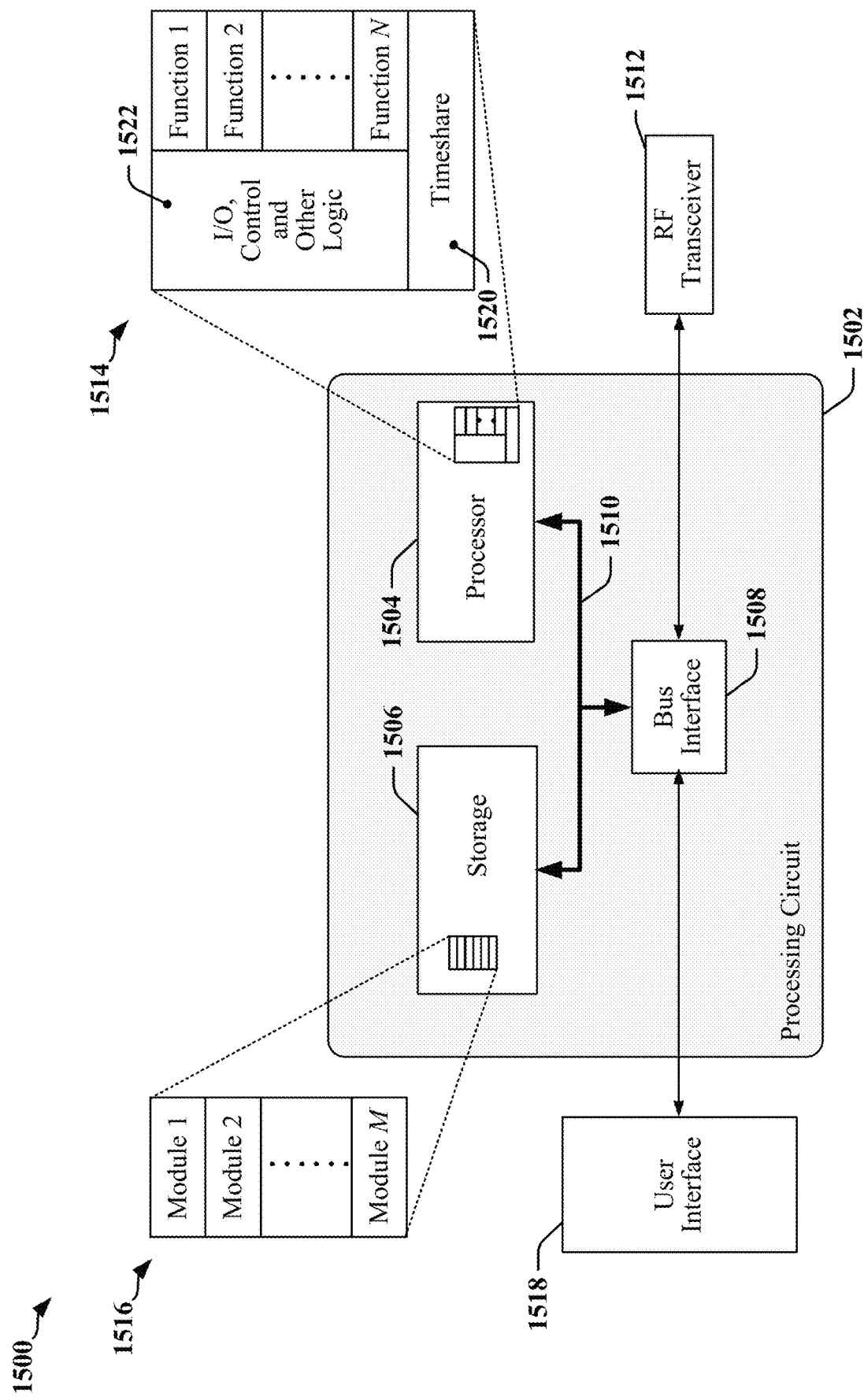
FIG. 15 illustrates one example of an apparatus employing a processing circuit that may be adapted according to certain aspects disclosed herein.

FIG. 15 illustrates an example of a hardware implementation for an apparatus 1500 that may be incorporated in a charging device or in a receiving device that enables a battery to be wirelessly charged. In some examples, the apparatus 1500 may perform one or more functions disclosed herein. In accordance with various aspects of the disclosure, an element, or any portion of an element, or any combination of elements as disclosed herein may be implemented using a processing circuit 1502. The processing circuit 1502 may include one or more processors 1504 that are controlled by some combination of hardware and software modules. Examples of processors 1504 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1504 may include specialized processors that perform specific functions, and that may be configured, augmented or controlled by one of the software modules 1516. The one or more processors 1504 may be configured through a combination of software modules 1516 loaded during initialization, and further configured by loading or unloading one or more software modules 1516 during operation.

In the illustrated example, the processing circuit 1502 may be implemented with a bus architecture, represented generally by the bus 1510. The bus 1510 may include any number of interconnecting buses and bridges depending on the specific application of the processing circuit 1502 and the overall design constraints. The bus 1510 links together various circuits including the one or more processors 1504, and storage 1506. Storage 1506 may include memory devices and mass storage devices and may be referred to herein as computer-readable media and/or processor-readable media. The storage 1506 may include transitory storage media and/or non-transitory storage media.

The bus 1510 may also link various other circuits such as timing sources, timers, peripherals, voltage regulators, and power management circuits. A bus interface 1508 may provide an interface between the bus 1510 and one or more transceivers 1512. In one example, a transceiver 1512 may be provided to enable the apparatus 1500 to communicate with a charging or receiving device in accordance with a standards-defined protocol. Depending upon the nature of the apparatus 1500, a user interface 1518 (e.g., keypad, display, speaker, microphone, joystick) may also be provided, and may be communicatively coupled to the bus 1510 directly or through the bus interface 1508.

A processor 1504 may be responsible for managing the bus 1510 and for general processing that may include the execution of software stored in a computer-readable medium that may include the storage 1506. In this respect, the processing circuit 1502, including the processor 1504, may be used to implement any of the methods, functions and techniques disclosed herein. The storage 1506 may be used for storing data that is manipulated by the processor 1504 when executing software, and the software may be configured to implement any one of the methods disclosed herein.

One or more processors 1504 in the processing circuit 1502 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1506 or in an external computer-readable medium. The external computer-readable medium and/or storage 1506 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1506 may also include, by way of example, a carrier wave, a transmission line, and any other suitable medium for transmitting software and/or instructions that may be accessed and read by a computer. Computer-readable medium and/or the storage 1506 may reside in the processing circuit 1502, in the processor 1504, external to the processing circuit 1502, or be distributed across multiple entities including the processing circuit 1502. The computer-readable medium and/or storage 1506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1506 may maintain and/or organize software in loadable code segments, modules, applications, programs, etc., which may be referred to herein as software modules 1516. Each of the software modules 1516 may include instructions and data that, when installed or loaded on the processing circuit 1502 and executed by the one or more processors 1504, contribute to a run-time image 1514 that controls the operation of the one or more processors 1504. When executed, certain instructions may cause the processing circuit 1502 to perform functions in accordance with certain methods, algorithms and processes described herein.

Some of the software modules 1516 may be loaded during initialization of the processing circuit 1502, and these software modules 1516 may configure the processing circuit 1502 to enable performance of the various functions disclosed herein. For example, some software modules 1516 may configure internal devices and/or logic circuits 1522 of the processor 1504 and may manage access to external devices such as a transceiver 1512, the bus interface 1508, the user interface 1518, timers, mathematical coprocessors, and so on. The software modules 1516 may include a control program and/or an operating system that interacts with interrupt handlers and device drivers, and that controls access to various resources provided by the processing circuit 1502. The resources may include memory, processing time, access to a transceiver 1512, the user interface 1518, and so on.

One or more processors 1504 of the processing circuit 1502 may be multifunctional, whereby some of the software modules 1516 are loaded and configured to perform different functions or different instances of the same function. The one or more processors 1504 may additionally be adapted to manage background tasks initiated in response to inputs from the user interface 1518, the transceiver 1512, and device drivers, for example. To support the performance of multiple functions, the one or more processors 1504 may be configured to provide a multitasking environment, whereby each of a plurality of functions is implemented as a set of tasks serviced by the one or more processors 1504 as needed or desired. In one example, the multitasking environment may be implemented using a timesharing program 1520 that passes control of a processor 1504 between different tasks, whereby each task returns control of the one or more processors 1504 to the timesharing program 1520 upon completion of any outstanding operations and/or in response to an input such as an interrupt. When a task has control of the one or more processors 1504, the processing circuit is effectively specialized for the purposes addressed by the function associated with the controlling task. The timesharing program 1520 may include an operating system, a main loop that transfers control on a round-robin basis, a function that allocates control of the one or more processors 1504 in accordance with a prioritization of the functions, and/or an interrupt driven main loop that responds to external events by providing control of the one or more processors 1504 to a handling function.

In one example, the apparatus 1500 includes or operates as a wireless charging apparatus that has a battery charging power source coupled to a charging circuit, a plurality of charging cells and a controller, which may be included in one or more processors 1504. The plurality of charging cells may be configured to provide a charging surface. At least one coil may be configured to direct an electromagnetic field through a charge transfer area of each charging cell.

The controller may be configured to initiate transmission of a digital ping at a first power level a transmitting coil of the wireless charging device, increase power level of the digital ping one or more times until current flowing to the transmitting coil has an amplitude that supports ASK modulation of the digital ping, and determine a charging configuration for transferring power to a chargeable device when a response to the digital ping is received from the chargeable device. In one example the controller may determine the charging configuration based on information identifying a capabilities or configuration of the chargeable device provided in the response. The charging configuration may be defined from information identifying a requested charging current provided in the response.

In certain examples, the current flowing to the transmitting coil may be calculated using a voltage level measured at the transmitting coil. The response to the digital ping includes information encoded in the voltage level measured at the transmitting coil is modulated using ASK modulation. The controller may determine current flowing to the transmitting coil has an amplitude that supports ASK modulation of the digital ping when the current flowing to the transmitting coil has an amplitude that equals or exceeds a threshold level. The controller may terminate the digital ping after a preconfigured duration of time unless an ASK modulated response is received. In some examples, the power level of the digital ping is increased by a preconfigured step value for each of the one or more power level increases.

In some implementations, the controller may determine that the chargeable device is present on or near a charging surface of the wireless charging device. Presence of the chargeable device on or near the charging surface may be determined using a passive ping procedure. The controller may transmit the first ping based on determined presence of the chargeable device on or near the charging surface.

In some implementations, a processor-readable storage medium may have instructions stored thereon which, when executed by at least one processor of the processing circuit 1502, cause the processing circuit 1502 to initiate transmission of a digital ping at a first power level a transmitting coil of the wireless charging device, increase power level of the digital ping one or more times until current flowing to the transmitting coil has an amplitude that supports ASK modulation of the digital ping, and determine a charging configuration for transferring power to a chargeable device when a response to the digital ping is received from the chargeable device.

The instructions may be further configured to cause the processing circuit 1502 to determine the charging configuration based on information identifying a capabilities or configuration of the chargeable device provided in the response.

The instructions may be further configured to cause the processing circuit 1502 to determine the charging configuration from information identifying a requested charging current provided in the response. The instructions may be further configured to cause the processing circuit 1502 to calculate the current flowing to the transmitting coil using a voltage level measured at the transmitting coil. The response to the digital ping includes information encoded in the voltage level measured at the transmitting coil is modulated using ASK modulation. The instructions may be further configured to cause the processing circuit 1502 to determine that the current flowing to the transmitting coil has an amplitude that supports ASK modulation of the digital ping when the current flowing to the transmitting coil has an amplitude that equals or exceeds a threshold level. The instructions may be further configured to cause the processing circuit 1502 to terminate the digital ping after a preconfigured duration of time unless an ASK modulated response is received. The power level of the digital ping may be increased by a preconfigured step value for each of the one or more power level increases. The instructions may be further configured to cause the processing circuit 1502 to determine that the chargeable device is present on or near a charging surface of the wireless charging device. Presence of the chargeable device on or near the charging surface may be determined using a passive ping procedure. T The instructions may be further configured to cause the processing circuit 1502 to transmit the first ping based on determined presence of the chargeable device on or near the charging surface.

Some implementation examples are described in the following numbered clauses:

1. A method performed at a wireless charging device, comprising: initiating transmission of a digital ping at a first power level a transmitting coil of the wireless charging device; increasing power level of the digital ping one or more times until current flowing to the transmitting coil has an amplitude that supports Amplitude Shift Key (ASK) modulation of the digital ping; and determining a charging configuration for transferring power to a chargeable device when a response to the digital ping is received from the chargeable device.
2. The method as described in clause 1, further comprising: determining the charging configuration based on information identifying a capabilities or configuration of the chargeable device provided in the response.
3. The method as described in clause 1 or clause 2, further comprising: determining the charging configuration from information identifying a requested charging current provided in the response.
4. The method as described in any of clauses 1-3, further comprising: calculating the current flowing to the transmitting coil using a voltage level measured at the transmitting coil.
5. The method as described in clause 4, wherein the response to the digital ping includes information encoded in the voltage level measured at the transmitting coil is modulated using ASK modulation.
6. The method as described in any of clauses 1-5, further comprising: determining that the current flowing to the transmitting coil has an amplitude that supports ASK modulation of the digital ping when the current flowing to the transmitting coil has an amplitude that equals or exceeds a threshold level.
7. The method as described in any of clauses 1-6, further comprising: terminating the digital ping after a preconfigured duration of time unless an ASK modulated response is received.
8. The method as described in any of clauses 1-7, wherein the power level of the digital ping is increased by a preconfigured step value for each of the one or more power level increases.
9. The method as described in any of clauses 1-8, further comprising: determining that the chargeable device is present on or near a charging surface of the wireless charging device, wherein presence of the chargeable device on or near the charging surface is determined using a passive ping procedure; and transmitting the digital ping based on determined presence of the chargeable device on or near the charging surface.
10. A processor-readable storage medium having instructions stored thereon which, when executed by at least one processor of a processing circuit, cause the processing circuit to: initiate transmission of a digital ping at a first power level a transmitting coil of a wireless charging device; increase power level of the digital ping one or more times until current flowing to the transmitting coil has an amplitude that supports Amplitude Shift Key (ASK) modulation of the digital ping; and determine a charging configuration for transferring power to a chargeable device when a response to the digital ping is received from the chargeable device.
11. The processor-readable storage medium as described in clause 10, wherein the instructions further cause the processing circuit to: determine the charging configuration based on information identifying a capabilities or configuration of the chargeable device provided in the response.
12. The processor-readable storage medium as described in clause 10 or clause 11, wherein the instructions further cause the processing circuit to: determine the charging configuration from information identifying a requested charging current provided in the response.
13. The processor-readable storage medium as described in any of clauses 10-12, wherein the instructions further cause the processing circuit to: calculate the current flowing to the transmitting coil using a voltage level measured at the transmitting coil.

14. The processor-readable storage medium as described in clause 13, wherein the response to the digital ping includes information encoded in the voltage level measured at the transmitting coil is modulated using ASK modulation.

15. The processor-readable storage medium as described in any of clauses 10-14, wherein the instructions further cause the processing circuit to: determine that the current flowing to the transmitting coil has an amplitude that supports ASK modulation of the digital ping when the current flowing to the transmitting coil has an amplitude that equals or exceeds a threshold level.

16. The processor-readable storage medium as described in any of clauses 10-15, wherein the instructions further cause the processing circuit to: terminate the digital ping after a preconfigured duration of time unless an ASK modulated response is received.

17. The processor-readable storage medium as described in any of clauses 10-16, wherein the power level of the digital ping is increased by a preconfigured step value for each of the one or more power level increases.

18. The processor-readable storage medium as described in any of clauses 10-17, wherein the instructions further cause the processing circuit to: determine that the chargeable device is present on or near a charging surface of the wireless charging device, wherein presence of the chargeable device on or near the charging surface is determined using a passive ping procedure; and transmit the digital ping based on determined presence of the chargeable device on or near the charging surface.

19. A wireless charging device, comprising: one or more charging cells provided on a charging surface of the wireless charging device; and a controller configured to: initiate transmission of a digital ping at a first power level a transmitting coil of the wireless charging device; increase power level of the digital ping one or more times until current flowing to the transmitting coil has an amplitude that supports Amplitude Shift Key (ASK) modulation of the digital ping; and determine a charging configuration for transferring power to a chargeable device when a response to the digital ping is received from the chargeable device.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method performed at a wireless charging device, comprising:
   configuring a step size for increasing transmitter power level during a clamp ramp;
   initiating transmission of power at a first power level through a transmitting coil of the wireless charging device;
   iteratively increasing transmitted power level by the configured step size until a current flowing through the transmitting coil has an amplitude that is less than a threshold current amplitude, the threshold current amplitude corresponding to a transmission power level that supports digital ping Amplitude Shift Key (ASK) encoding; and
   determining a charging configuration for transferring power to a chargeable device when a response is received from the chargeable device in an ASK modulated signal.

2. The method of claim 1, further comprising:
   modifying the charging configuration based on information identifying capabilities or a configuration of the chargeable device provided in the response.

3. The method of claim 1, further comprising:
   modifying the charging configuration based on information identifying a requested charging current provided in the response.

4. The method of claim 1, further comprising:
   calculating the current flowing to the transmitting coil using a voltage level measured at the transmitting coil.

5. The method of claim 4, wherein the response received from the chargeable device includes information encoded in the voltage level measured at the transmitting coil using ASK modulation.

6. The method of claim 1, wherein for each iteration, amplitude of the current flowing through the transmitting coil is determined during a step that has a maximum duration configured for the clamp ramp.

7. The method of claim 1, further comprising:
   terminating the transmission of power for each iteration after a preconfigured duration of time unless an ASK modulated response is received from the chargeable device.

8. The method of claim 1, wherein the transmitter power level is increased by the step size for each step in the clamp ramp.

9. The method of claim 1, further comprising:
   determining that the chargeable device is present on or near a charging surface of the wireless charging device, wherein presence of the chargeable device on or near the charging surface is determined using a passive ping procedure; and
   initiating transmission of power after determining presence of the chargeable device on or near the charging surface.

10. A processor-readable storage medium having instructions stored thereon which, when executed by at least one processor of a processing circuit, cause the processing circuit to:
    configure a step size for increasing transmitter power level during a clamp ramp;
    initiate transmission of power at a first power level through a transmitting coil a wireless charging device;
    iteratively increasing transmitted power level by the configured step size until a current flowing through the transmitting coil has an amplitude that is less than a threshold current amplitude, the threshold current amplitude corresponding to a transmission power level that supports digital ping Amplitude Shift Key (ASK) encoding; and determine a charging configuration for transferring power to a chargeable device when a response is received from the chargeable device in an ASK modulated signal.

11. The processor-readable storage medium of claim 10, wherein the instructions further cause the processing circuit to:

modify the charging configuration based on information identifying capabilities or a configuration of the chargeable device provided in the response.

12. The processor-readable storage medium of claim 10, wherein the instructions further cause the processing circuit to:

modify the charging configuration based on information identifying a requested charging current provided in the response.

13. The processor-readable storage medium of claim 10, wherein the instructions further cause the processing circuit to:

calculate the current flowing to the transmitting coil using a voltage level measured at the transmitting coil.

14. The processor-readable storage medium of claim 13, wherein the response received from the chargeable device includes information encoded in the voltage level measured at the transmitting coil using ASK modulation.

15. The processor-readable storage medium of claim 10, wherein for each iteration, amplitude of the current flowing through the transmitting coil is determined during a step that has a maximum duration configured for the clamp ramp.

16. The processor-readable storage medium of claim 10, wherein the instructions further cause the processing circuit to:

terminate the transmission of power for each iteration after a preconfigured duration of time unless an ASK modulated response is received from the chargeable device.

17. The processor-readable storage medium of claim 10, wherein the transmitter power level is increased by the step size for each step in the clamp ramp.

18. The processor-readable storage medium of claim 10, wherein the instructions further cause the processing circuit to:

determine that the chargeable device is present on or near a charging surface of the wireless charging device, wherein presence of the chargeable device on or near the charging surface is determined using a passive ping procedure; and initiate transmission of power after determining presence of the chargeable device on or near the charging surface.

19. A wireless charging device, comprising:

one or more charging cells provided on a charging surface of the wireless charging device; and a controller configured to:

configure a step size for increasing transmitter power level during a clamp ramp;

configure a maximum duration for each iteration of a digital ping clamp ramp;

initiate transmission of power at a first power level through a transmitting coil of the wireless charging device;

iteratively increasing transmitted power level by the configured step size until a current flowing through the transmitting coil has an amplitude that is less than a threshold current amplitude, the threshold current amplitude corresponding to a transmission power level that supports digital ping Amplitude Shift Key (ASK) encoding; and determine a charging configuration for transferring power to a chargeable device when a response is received from the chargeable device in an ASK modulated signal.

\* \* \* \* \*